United States Patent
Mitchell et al.

(10) Patent No.: US 7,614,508 B2
(45) Date of Patent: *Nov. 10, 2009

(54) WATER FILTER MATERIALS, WATER FILTERS AND KITS CONTAINING SILVER COATED PARTICLES AND PROCESSES FOR USING THE SAME

(75) Inventors: Michael Donovan Mitchell, Cincinnati, OH (US); Dimitris Ioannis Collias, Mason, OH (US); David William Bjorkquist, Wyoming, OH (US); Piyush Narendra Zaveri, Mason, OH (US); Matthew Morgan Woolley, Chapel Hill, NC (US)

(73) Assignee: PUR Water Purification Products Inc., Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/705,572

(22) Filed: Nov. 11, 2003

(65) Prior Publication Data
US 2004/0159596 A1    Aug. 19, 2004

Related U.S. Application Data

(63) Continuation-in-part of application No. 10/464,209, filed on Jun. 18, 2003, now abandoned, and a continuation-in-part of application No. 10/464,210, filed on Jun. 18, 2003, said application No. 10/464,209 is a continuation-in-part of application No. 09/935,962, filed on Aug. 23, 2001, now abandoned, said application No. 10/464,210 is a continuation-in-part of application No. 09/935,810, filed on Aug. 23, 2001, now abandoned, application No. 10/705,572, which is a continuation of application No. PCT/US03/05416, filed on Feb. 21, 2003, and a continuation of application No. PCT/US03/05409, filed on Feb. 21, 2003.

(51) Int. Cl.
B01D 39/00 (2006.01)
B01D 39/14 (2006.01)
B01D 35/00 (2006.01)
B01D 27/00 (2006.01)

(52) U.S. Cl. .............. 210/506; 210/501; 210/502.1; 210/504; 210/505; 210/508

(58) Field of Classification Search .............. 210/501, 210/502.1, 504, 505, 506, 508
See application file for complete search history.

(56) References Cited

U.S. PATENT DOCUMENTS 1,782,850 A * 11/1930 Hill .................... 210/673

(Continued)

FOREIGN PATENT DOCUMENTS

DE          93 12 279       10/1993

(Continued)

OTHER PUBLICATIONS

U.S. Appl. No. 09/574,456, filed May 19, 2000, Tremblay et al.
Dimitris Ioannis Collias, Declaration under 37 CFR §1.132, Apr. 1, 2004.

(Continued)

*Primary Examiner*—John Kim
(74) *Attorney, Agent, or Firm*—Cynthia L. Clay; Andrew A. Paul; Kelly L. McDow

(57) ABSTRACT

A filter for providing potable water is provided. The filter includes a housing having an inlet and an outlet, a filter material disposed within the housing, the filter material formed at least in part from a plurality of mesoporous, basic, and reduced-oxygen activated carbon filter particles. Preferably, at least some of the mesoporous activated carbon filter particles are coated with silver or a silver containing material. Kits comprising filters and information relating to the killing or removal of bacteria, viruses, and microbials are also provided.

17 Claims, 13 Drawing Sheets

U.S. PATENT DOCUMENTS

| | | | |
|---|---|---|---|
| 3,950,267 A | | 4/1976 | Arakawa et al. |
| 4,045,553 A | * | 8/1977 | Mitsumori et al. ......... 424/618 |
| 4,081,370 A | | 3/1978 | Schmitt, Jr. et al. |
| 4,283,283 A | | 8/1981 | Zimmerman |
| 4,389,311 A | * | 6/1983 | La Freniere ............. 210/198.1 |
| 4,396,512 A | * | 8/1983 | Beauman et al. ............ 210/668 |
| 4,448,695 A | | 5/1984 | Gordon, Jr. et al. |
| 4,552,863 A | | 11/1985 | Fujimori |
| 4,654,075 A | | 3/1987 | Cipollini |
| 4,670,482 A | | 6/1987 | Dilling |
| 4,822,765 A | | 4/1989 | Nishimura |
| 4,969,996 A | | 11/1990 | Hankammer |
| 4,978,650 A | | 12/1990 | Coughlin et al. |
| 5,204,310 A | | 4/1993 | Tolles et al. |
| 5,376,279 A | * | 12/1994 | Judd et al. ................. 204/518 |
| 5,431,813 A | | 7/1995 | Daniels |
| 5,466,378 A | | 11/1995 | Dussert et al. |
| 5,487,917 A | | 1/1996 | Gadkaree |
| 5,521,008 A | | 5/1996 | Lieberman et al. |
| 5,527,451 A | | 6/1996 | Hembree et al. |
| 5,536,394 A | | 7/1996 | Lund et al. |
| 5,670,124 A | | 9/1997 | Itoga et al. |
| 5,702,498 A | | 12/1997 | Huang |
| 5,709,794 A | | 1/1998 | Emmons et al. |
| 5,772,896 A | * | 6/1998 | Denkewicz et al. ......... 210/754 |
| 5,773,143 A | | 6/1998 | Vermillion et al. |
| 5,776,385 A | | 7/1998 | Gadkaree et al. |
| 5,834,114 A | | 11/1998 | Economy et al. |
| 5,882,507 A | | 3/1999 | Tanner et al. |
| 5,957,034 A | | 9/1999 | Sham et al. |
| 6,057,262 A | * | 5/2000 | Derbyshire et al. ......... 502/423 |
| 6,103,114 A | | 8/2000 | Tanner et al. |
| 6,120,685 A | | 9/2000 | Carlson et al. |
| 6,145,670 A | | 11/2000 | Risser |
| 6,214,224 B1 | | 4/2001 | Farley |
| 6,228,803 B1 | * | 5/2001 | Gadkaree et al. ............ 502/416 |
| 6,241,893 B1 | * | 6/2001 | Levy .......................... 210/660 |
| 6,241,899 B1 | | 6/2001 | Ramos |
| 6,274,041 B1 | * | 8/2001 | Williamson et al. ......... 210/243 |
| 6,565,749 B1 | | 5/2003 | Hou et al. |
| 6,630,016 B2 | * | 10/2003 | Koslow ....................... 95/285 |
| 6,660,166 B2 | * | 12/2003 | Tremblay et al. ............ 210/694 |
| 6,827,854 B2 | * | 12/2004 | Mitchell et al. ............. 210/263 |
| 6,881,348 B2 | * | 4/2005 | Cannon et al. .............. 210/681 |
| 2002/0074294 A1 | | 6/2002 | Tremblay et al. |
| 2002/0148785 A1 | | 10/2002 | Mitchell et al. |
| 2002/0150686 A1 | | 10/2002 | Mitchell et al. |
| 2002/0172637 A1 | * | 11/2002 | Chesneau et al. ....... 423/445 R |
| 2003/0038084 A1 | | 2/2003 | Mitchell et al. |
| 2003/0096703 A1 | | 5/2003 | Mitchell et al. |
| 2003/0106851 A1 | | 6/2003 | Tremblay et al. |
| 2003/0136728 A1 | | 7/2003 | Jagtoyen et al. |
| 2004/0040906 A1 | * | 3/2004 | Jagtoyen et al. .......... 210/502.1 |

FOREIGN PATENT DOCUMENTS

| | | |
|---|---|---|
| EP | 367389 | 5/1990 |
| EP | 0 490 317 | 6/1992 |
| EP | 1 419 109 | 12/2005 |
| FR | 2331 515 | 6/1977 |
| FR | 2743 285 | 7/1997 |
| GB | 1163426 | 9/1969 |
| JP | 05049921 | 3/1993 |
| JP | 2000281445 | 10/2000 |
| RU | 2 034 789 | 5/1995 |
| RU | 2 064 429 | 7/1996 |
| RU | 2 070 438 | 12/1996 |
| SU | 1717538 | 3/1992 |
| WO | WO 94/10091 | 3/1994 |
| WO | WO 99/10076 | 3/1999 |
| WO | WO 02/068324 | 9/2002 |
| WO | WO 02/083266 | 10/2002 |
| WO | WO 02/098536 | 12/2002 |
| WO | WO 02/100509 | 12/2002 |
| WO | WO 03/068686 | 8/2003 |

OTHER PUBLICATIONS

Newcombe, G., et al., "Granular activated Carbon: importance of surface properties in the adsorption of naturally occurring organics", *Colloids and Surfaces A: Physiochemical and Engineering Aspects*, 1993, 65-71, vol. 78.

Gregg, S.J., et al., "Mesoporous solids: the Type IV isotherm", *Adsorption, Surface Area and Porosity*, 1982, 137-143, 2nd Edition, Academic Press, Inc.

Report of Task Force, "Guide Standard and Protocol for Testing Microbiological Water Purifiers", *United States Environmental Protection Agency,* (submitted Apr. 1986), revised Apr. 1987, 1-39.

Westvaco Products On-Line, "Wood-based Activated Carbons", (2 pgs), downloaded Jul. 2001.

Abotsi, Godried, "Interfacial Properties of Coal: A Guide to Catalyst Loading and Dispersion for Coal Conversion", *Energia*, vol. 7, No. 5, 3-5, (1996).

Moreno-Castilla, C., et al., "The Creation of Acid Carbon Surfaces by Treatment with $(NH_4)_2S_2O_8$", *Carbon* vol. 35, No. 10-11, 1619-1626 (1997).

Franz, M., et al., "Effect of Chemical Surface Heterogeneity on the Adsorption Mechanism of Dissolved Aromatics on Activated Carbon", *Carbon*, vol. 28, No. 13, 1807-1819, (2000).

Babic, B.M., et al., "Point of Zero Charge and Intrinsic Equilibrium Constants of Activated Carbon Cloth", *Carbon* vol. 37, No. 3, 477-481, (Feb. 22, 1999).

Menendez, J.A., et al., "On the Difference Between the Isoelectric Point and the Point of Zero Charge of Carbons", *Carbon*, vol. 33, No. 11, 1655-1657, (1995).

* cited by examiner

WATER FILTER MATERIALS, WATER FILTERS AND KITS CONTAINING SILVER COATED PARTICLES AND PROCESSES FOR USING THE SAME

CROSS REFERENCE TO RELATED APPLICATION

Pursuant to 35 U.S.C. § 120, this application is a continuation-in-part of U.S. application Ser. Nos. 10/464,209 now abandoned and 10/464,210, both of which were filed on Jun. 18, 2003 which are continuations-in-part of U.S. application Ser. Nos. 09/935,962 and 09/935,810, both of which were filed on Aug. 23, 2001 now abandoned, the substances of which are incorporated herein by reference. Additionally, pursuant to 35 U.S.C. § 120, this application is a continuation of International Application No. PCT/US03/05416 designating the U.S., filed Feb. 21, 2003, and is also a continuation of International Application No. PCT/US03/05409 designating the U.S., filed Feb. 21, 2003, the substances of which are incorporated herein by reference.

FIELD OF THE INVENTION

The present invention relates to the field of water filter materials and water filters and processes for using the same, and, more particularly, to the field of water filters containing mesoporous activated carbon particles.

BACKGROUND OF THE INVENTION

Water may contain many different kinds of contaminants including, for example, particulates, harmful chemicals, and microbiological organisms, such as bacteria, parasites, protozoa and viruses. In a variety of circumstances, these contaminants must be removed before the water can be used. For example, in many medical applications and in the manufacture of certain electronic components, extremely pure water is required. As a more common example, any harmful contaminants must be removed from the water before it is potable, i.e., fit to consume. Despite modem water purification means, the general population is at risk, and in particular infants and persons with compromised immune systems are at considerable risk.

In the U.S. and other developed countries, municipally treated water typically includes one or more of the following impurities: suspended solids, bacteria, parasites, viruses, organic matter, heavy metals, and chlorine. Breakdown and other problems with water treatment systems sometimes lead to incomplete removal of bacteria and viruses. In other countries, there are deadly consequences associated with exposure to contaminated water, as some of them have increasing population densities, increasingly scarce water resources, and no water treatment utilities. It is common for sources of drinking water to be in close proximity to human and animal waste, such that microbiological contamination is a major health concern. As a result of waterborne microbiological contamination, an estimated six million people die each year, half of which are children under 5 years of age.

In 1987, the U.S. Environmental Protection Agency (EPA) introduced the "*Guide Standard and Protocol for Testing Microbiological Water Purifiers*". The protocol establishes minimum requirements regarding the performance of drinking water treatment systems that are designed to reduce specific health related contaminants in public or private water supplies. The requirements are that the effluent from a water supply source exhibits 99.99% (or equivalently, 4 log) removal of viruses and 99.9999% (or equivalently, 6 log) removal of bacteria against a challenge. Under the EPA protocol, in the case of viruses, the influent concentration should be $1 \times 10^7$ viruses per liter, and in the case of bacteria, the influent concentration should be $1 \times 10^8$ bacteria per liter. Because of the prevalence of *Escherichia coli* (*E. coli*, bacterium) in water supplies, and the risks associated with its consumption, this microorganism is used as the bacterium in the majority of studies. Similarly, the MS-2 bacteriophage (or simply, MS-2 phage) is typically used as the representative microorganism for virus removal because its size and shape (i.e., about 26 nm and icosahedral) are similar to many viruses. Thus, a filter's ability to remove MS-2 bacteriophage demonstrates its ability to remove other viruses.

Due to these requirements and a general interest in improving the quality of potable water, there is a continuing desire to provide processes for manufacturing filter materials and filters, which are capable of removing bacteria and/or viruses from a fluid.

SUMMARY OF THE INVENTION

A filter for providing potable water is provided. The filter includes a housing having an inlet and an outlet, a filter material disposed within the housing, the filter material formed at least in part from a plurality of mesoporous activated carbon filter particles. The filter material preferably comprises particles selected from the group consisting of mesoporous activated carbon filter particles coated entirely with silver or a silver containing material, mesoporous activated carbon filter particles partially coated with silver or a silver containing material, silver particles and mixtures thereof.

In another aspect of the present invention there is provided a kit comprising a filter for providing potable water. The filter comprises a housing having an inlet and an outlet, and a filter material disposed within the housing formed at least in part from a plurality of mesoporous activated carbon filter particles. The kit further comprises a package for containing the filter and either the package or the filter housing comprises information that the filter or filter material provides: bacterial removal; virus removal; microbial removal; killing of bacteria, killing of viruses, killing of microbials, or any combination of these.

BRIEF DESCRIPTION OF THE DRAWINGS

While the specification concludes with claims particularly pointing out and distinctly claiming the invention, it is believed that the present invention will be better understood from the following description taken in conjunction with the accompanying drawings in which:

FIG. 2a is a mesopore volume distribution of the particles of FIG. 1a.

FIG. 3a is a point-of-zero-charge graph of the particles of FIG. 1a.

FIG. 5a illustrates the E. coli bath concentration as a function of time for the activated carbon particles of FIG. 1a.

FIG. 6a illustrates the MS-2 bath concentration as a function of time for the activated carbon particles of FIG. 1a.

DETAILED DESCRIPTION OF THE PREFERRED EMBODIMENTS

Figure 1A:
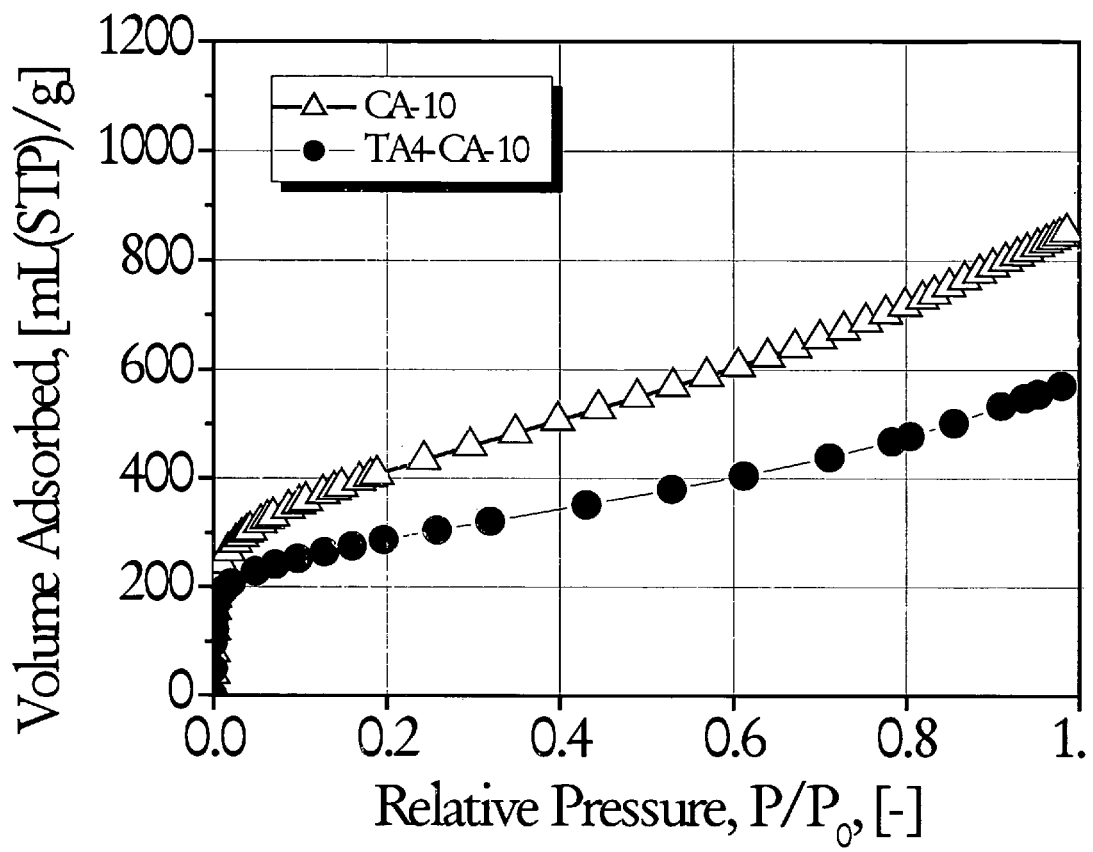
FIG. 1a is a BET nitrogen adsorption isotherm of mesoporous and acidic activated carbon particles CA-10, and mesoporous, basic, and reduced-oxygen activated carbon particles TA4-CA-10.

All documents cited are, in relevant part, incorporated herein by reference. The citation of any document is not to be construed as an admission that it is prior art with respect to the present invention.

I. Definitions

As used herein, the terms "filters" and "filtration" refer to structures and mechanisms, respectively, associated with microorganism removal (and/or other contaminant removal), via primarily adsorption and/or size exclusion to a lesser extent.

As used herein, the phrase "filter material" is intended to refer to an aggregate of filter particles. The aggregate of the filter particles forming a filter material can be either homogeneous or heterogeneous. The filter particles can be uniformly or non-uniformly distributed (e.g., layers of different filter particles) within the filter material. The filter particles forming a filter material also need not be identical in shape or size and may be provided in either a loose or interconnected form. For example, a filter material might comprise mesoporous and basic activated carbon particles in combination with activated carbon fibers, and these filter particles may be either provided in loose association or partially or wholly bonded by a polymeric binder or other means to form an integral structure.

As used herein, the phrase "filter particle" is intended to refer to an individual member or piece, which is used to form at least part of a filter material. For example, a fiber, a granule, a bead, etc. are each considered filter particles herein. Further, the filter particles can vary in size, from impalpable filter particles (e.g., a very fine powder) to palpable filter particles.

As used herein, the phrase "filter material pore volume" refers to the total volume of the inter-particle pores in the filter material with sizes larger than 0.1 µm.

As used herein, the phrase "filter material total volume" refers to the sum of the inter-particle pore volume and the volume occupied by the filter particles.

As used herein, the terms "microorganism", "microbiological organism" and "pathogen" are used interchangeably. These terms refer to various types of microorganisms that can be characterized as bacteria, viruses, parasites, protozoa, and germs.

As used herein, the phrase "Bacteria Removal Index" (BRI) of filter particles is defined as:

$$BRI=100\times[1-(\text{bath concentration of } E.\ coli \text{ bacteria at equilibrium/control concentration of } E.\ coli \text{ bacteria})],$$

wherein "bath concentration of E. coli bacteria at equilibrium" refers to the concentration of bacteria at equilibrium in a bath that contains a mass of filter particles having a total external surface area of 1400 cm$^2$ and Sauter mean diameter less than 55 µm, as discussed more fully hereafter. Equilibrium is reached when the E. coli concentration, as measured at two time points 2 hours apart, remains unchanged to within half order of magnitude. The phrase "control concentration of E. coli bacteria" refers to the concentration of E. coli bacteria in the control bath, and is equal to about $3.7\times10^9$ CFU/L. The Sauter mean diameter is the diameter of a particle whose surface-to-volume ratio is equal to that of the entire particle distribution. Note that the term "CFU/L" denotes "colony-forming units per liter", which is a typical term used in E. coli counting. The BRI index is measured without application of chemical agents that provide bactericidal effects. An equivalent way to report the removal capability of filter particles is with the "Bacteria Log Removal Index" (BLRI), which is defined as:

$$BLRI=-\log[1-(BRI/100)].$$

The BLRI has units of "log" (where "log" stands for logarithm). For example, filter particles that have a BRI equal to 99.99% have a BLRI equal to 4 log. A test procedure for determining BRI and BLRI values is provided hereafter.

As used herein, the phrase "Virus Removal Index" (VRI) for filter particles is defined as:

$$VRI=100\times[1-(\text{bath concentration of MS-2 phages at equilibrium/control concentration of MS-2 phages})],$$

wherein "bath concentration of MS-2 phages at equilibrium" refers to the concentration of phages at equilibrium in a bath that contains a mass of filter particles having a total external surface area of 1400 cm$^2$ and Sauter mean diameter less than 55 µm, as discussed more fully hereafter. Equilibrium is reached when the MS-2 concentration, as measured at two time points 2 hours apart, remains unchanged to within half order of magnitude. The phrase "control concentration of MS-2 phages" refers to the concentration of MS-2 phages in the control bath, and is equal to about $6.7\times10^7$ PFU/L. Note that the term "PFU/L" denotes "plaque-forming units per liter", which is a typical term used in MS-2 counting. The VRI index is measured without application of chemical agents that provide virucidal effects. An equivalent way to report the removal capability of filter particles is with the "Viruses Log Removal Index" (VLRI), which is defined as:

$$VLRI=-\log[1-(VRI/100)].$$

The VLRI has units of "log" (where "log" is the logarithm). For example, filter particles that have a VRI equal to 99.9% have a VLRI equal to 3 log. A test procedure for determining VRI and VLRI values is provided hereafter.

As used herein, the phrase "Filter Bacteria Log Removal (F-BLR)" refers to the bacteria removal capability of the filter after the flow of the first 2,000 filter material pore volumes. The F-BLR is defined and calculated as:

$$F\text{-}BLR = -\log[(\text{effluent concentration of } E.\ coli)/(\text{influent concentration of } E.\ coli)],$$

where the "influent concentration of *E. coli*" is set to about $1 \times 10^8$ CFU/L continuously throughout the test and the "effluent concentration of *E. coli*" is measured after about 2,000 filter material pore volumes flow through the filter. F-BLR has units of "log" (where "log" is the logarithm). Note that if the effluent concentration is below the limit of detection of the technique used to assay, then the effluent concentration for the calculation of the F-BLR is considered to be the limit of detection. Also, note that the F-BLR is measured without application of chemical agents that provide bactericidal effects.

As used herein, the phrase "Filter Viruses Log Removal (F-VLR)" refers to the virus removal capability of the filter after the flow of the first 2,000 filter material pore volumes. The F-VLR is defined and calculated as:

$$F\text{-}VLR = -\log[(\text{effluent concentration of } MS\text{-}2)/(\text{influent concentration of } MS\text{-}2)],$$

where the "influent concentration of MS-2" is set to about $1 \times 10^7$ PFU/L continuously throughout the test and the "effluent concentration of MS-2" is measured after about 2,000 filter material pore volumes flow through the filter. F-VLR has units of "log" (where "log" is the logarithm). Note that if the effluent concentration is below the limit of detection of the technique used to assay, then the effluent concentration for the calculation of the F-VLR is considered to be the limit of detection. Also, note that the F-VLR is measured without application of chemical agents that provide virucidal effects.

As used herein, the phrase "total external surface area" is intended to refer to the total geometric external surface area of one or more of the filter particles, as discussed more fully hereafter.

As used herein, the phrase "specific external surface area" is intended to refer to the total external surface area per unit mass of the filter particles, as discussed more fully hereafter.

As used herein, the term "micropore" is intended to refer to an intra-particle pore having a width or diameter less than 2 nm (or equivalently, 20 Å).

As used herein, the term "mesopore" is intended to refer to an intra-particle pore having a width or diameter between 2 nm and 50 nm (or equivalently, between 20 Å and 500 Å).

As used herein, the term "macropore" is intended to refer to an intra-particle pore having a width or diameter greater than 50 nm (or equivalently, 500 Å)

As used herein, the phrase "total pore volume" and its derivatives are intended to refer to the volume of all the intra-particle pores, i.e., micropores, mesopores and macropores. The total pore volume is calculated as the volume of nitrogen adsorbed at a relative pressure of 0.9814 using the BET process (ASTM D 4820-99 standard), a process well known in the art.

As used herein, the phrase "micropore volume" and its derivatives are intended to refer to the volume of all micropores. The micropore volume is calculated from the volume of nitrogen adsorbed at a relative pressure of 0.15 using the BET process (ASTM D 4820-99 standard), a process well known in the art.

As used herein, the phrase "sum of the mesopore and macropore volumes" and its derivatives are intended to refer to the volume of all mesopores and macropores. The sum of the mesopore and macropore volumes is equal to the difference between the total pore volume and micropore volume, or equivalently, is calculated from the difference between the volumes of nitrogen adsorbed at relative pressures of 0.9814 and 0.15 using the BET process (ASTM D 4820-99 standard), a process well known in the art.

As used herein, the phrase "pore size distribution in the mesopore range" is intended to refer to the distribution of the pore size as calculated by the Barrett, Joyner, and Halenda (BJH) process, a process well known in the art.

As used herein, the term "carbonization" and its derivatives are intended to refer to a process in which the non-carbon atoms in a carbonaceous substance are reduced.

As used herein, the term "activation" and its derivatives are intended to refer to a process in which a carbonized substance is rendered more porous.

As used herein, the term "activated carbon particles" or "activated carbon filter particles" and their derivatives are intended to refer to carbon particles that have been subjected to an activation process.

As used herein, the phrase "point of zero charge" is intended to refer to the pH above which the total surface of the carbon particles is negatively charged. A well known test procedure for determining the point of zero charge is set forth hereafter.

As used herein, the term "basic" is intended to refer to filter particles with a point of zero charge greater than 7.

As used herein, the term "acidic" is intended to refer to filter particles with a point of zero charge less than 7.

As used herein, the phrase "mesoporous activated carbon filter particle" refers to an activated carbon filter particle wherein the sum of the mesopore and macropore volumes may be greater than 0.12 mL/g.

As used herein, the phrase "microporous activated carbon filter particle" refers to an activated carbon filter particle wherein the sum of the mesopore and macropore volumes may be less than 0.12 mL/g.

As used herein, the phrase "mesoporous and basic activated carbon filter particle" is intended to refer to an activated carbon filter particle wherein the sum of the mesopore and macropore volumes may be greater than 0.12 mL/g and has a point of zero charge greater than 7.

As used herein, the phrase "mesoporous, basic, and reduced-oxygen activated carbon filter particle" is intended to refer to an activated carbon filter particle wherein the sum of the mesopore and macropore volumes may be greater than 0.12 mL/g, has a point of zero charge greater than 7, and has a bulk oxygen percentage by weight of 1.5% or less.

As used herein, the phrase "mesoporous and acidic activated carbon filter particle" is intended to refer to an activated carbon filter particle wherein the sum of the mesopore and macropore volumes may be greater than 0.12 mL/g and has a point of zero charge less than 7.

As used herein, the phrase "starting material" refers to any precursor containing mesopores and macropores or capable of yielding mesopores and macropores during carbonization and/or activation.

As used herein, the phrase "axial flow" refers to flow through a planar surface and perpendicularly to that surface.

As used herein, the phrase "radial flow" typically refers to flow through essentially cylindrical or essentially conical surfaces and perpendicularly to those surfaces.

As used herein, the phrase "face area" refers to the area of the filter material initially exposed to the influent water. For example, in the case of axial flow filters, the face area is the cross sectional area of the filter material at the entrance of the fluid, and in the case of the radial flow filter, the face area is the outside area of the filter material.

As used herein, the phrase "filter depth" refers to the linear distance that the influent water travels from the entrance to the exit of the filter material. For example, in the case of axial flow filters, the filter depth is the thickness of the filter material, and in the case of the radial flow filter, the filter depth is half of the difference between the outside and inside diameters of the filter material.

As used herein, the phrases "average fluid residence time" and/or "average fluid contact time" refer to the average time that the fluid is in contact with the filter particles inside the filter as it travels through the filter material, and are calculated as the ratio of the filter material pore volume to the fluid flow rate.

As used herein, the phrases "filter porosity" and/or "filter bed porosity" refer to the ratio of the filter material pore volume to the filter material total volume.

As used herein, the phrase "inlet" refers to the means in which a fluid is able to enter the filter or filter material. For example, the inlet can be a structure that is part of the filter, or the filter material face area.

As used herein, an "outlet" refers to the means in which a fluid is able to exit the filter or filter material. For example, the outlet can be a structure that is part of the filter, or the cross sectional area of the filter material at the exit of the fluid.

II. Mesoporous Activated Carbon Filter Particles

Unexpectedly it has been found that mesoporous activated carbon filter particles adsorb a larger number of microorganisms compared to Inicroporous activated carbon filter particles. Also, unexpectedly it has been found that mesoporous and basic activated carbon filter particles adsorb a larger number of microorganisms compared to that adsorbed by mesoporous and acidic activated carbon filter particles. Furthermore, it has been found unexpectedly that mesoporous, basic, and reduced-oxygen activated carbon filter particles adsorb a larger number of microorganisms compared to that adsorbed by mesoporous and basic activated carbon filter particles without reduced bulk oxygen percentage by weight.

Although not wishing to be bound by any theory applicants hypothesize that, with regard to porosity, a large number of mesopores and/or macropores provides more convenient adsorption sites (openings or entrances of the mesopores/macropores) for the pathogens, their fimbriae, and surface polymers (e.g. proteins, lipopolysaccharides, oligosaccharides and polysaccharides) that constitute the outer membranes, capsids and envelopes of the pathogens because the typical size of such is similar to that of the entrances of the mesopores and macropores. Also, mesoporosity and macroporosity may correlate with one or more surface properties of the carbon, such as surface roughness.

Also, not wishing to be bound by theory, applicants hypothesize that basic activated carbon surfaces contain the types of functionality that are necessary to attract a larger number of microorganisms compared to those attracted by an acidic carbon surface. This enhanced adsorption onto the basic carbon surfaces might be attributed to the fact that the basic carbon surfaces attract the typically negatively-charged microorganisms and functional groups on their surface. Applicants further hypothesize that basic carbon is capable of producing disinfectants when placed in water by reducing molecular oxygen. Although the final product of the reduction is hydroxide, applicants believe that reactive oxygen intermediates, such as superoxide, hydroperoxide, and/or hydroxy radicals, are formed and maybe sufficiently long-lived to diffuse from carbon into bulk solution.

Furthermore, applicants believe that carbon becomes more basic as the bulk oxygen percentage by weight is reduced. A low bulk oxygen percentage by weight may lead to improved bacteria/viruses adsorption because there will be: (1) less carboxylic acids and hence a less negative surface to repel bacteria/viruses; and (2) a less hydrated surface so that water is more easily displaced by bacteria/viruses as they attempt to adsorb to the surface (i.e., less of an energy penalty for the bacteria/virus to displace other species already occupying sites on the surface). This latter reason (i.e., a less hydrated surface) also ties in with the idea that the ideal surface, discussed hereafter, should be somewhat hydrophobic (that is, it should have just enough oxygen substitution on the edge carbon atoms to allow it to wet out, but not so much as to make it excessively hydrophilic).

The filter particles can be provided in a variety of shapes and sizes. For example, the filter particles can be provided in simple forms such as powder, granules, fibers, and beads. The filter particles can be provided in the shape of a sphere, polyhedron, cylinder, as well as other symmetrical, asymmetrical, and irregular shapes. Further, the filter particles can also be formed into complex forms such as webs, screens, meshes, non-wovens, wovens, and bonded blocks, which may or may not be formed from the simple forms described above. Like shape, the size of the filter particle can also vary, and the size need not be uniform among filter particles used in any single filter. In fact, it can be desirable to provide filter particles having different sizes in a single filter. Generally, the size of the filter particles may be between about 0.1 µm and about 10 mm, preferably between about 0.2 µm and about 5 mm, more preferably between about 0.4 µm and about 1 mm, and most preferably between about 1 µm and about 500 µm. For spherical and cylindrical particles (e.g., fibers, beads, etc.), the above-described dimensions refer to the diameter of the filter particles. For filter particles having substantially different shapes, the above-described dimensions refer to the largest dimension (e.g. length, width, or height).

The filter particles may be the product of any precursor that contains mesopores and macropores or generates mesopores and macropores during carbonization and/or activation. For example, and not by way of limitation, the filter particles can be wood-based activated carbon particles, coal-based activated carbon particles, peat-based activated carbon particles, pitch-based activated carbon particles, tar-based activated carbon particles, bean-based activated carbon particles, other lignocellulosic-based activated carbon particles, and mixtures thereof.

Activated carbon can display acidic, neutral, or basic properties. The acidic properties are associated with oxygen-containing functionalities or functional groups, such as, and not by way of limitation, phenols, carboxyls, lactones, hydroquinones, anhydrides, and ketones. The basic properties have heretofore been associated with functionalities such as pyrones, chromenes, ethers, carbonyls, as well as the basal plane $\pi$ electrons. The acidity or basicity of the activated carbon particles is determined with the "point of zero charge" technique (Newcombe, G., et al., *Colloids and Surfaces A: Physicochemical and Engineering Aspects*, 78, 65-71 (1993)), the substance of which is incorporated herein by reference. The technique is further described in Section VII hereafter. Filter particles of the present invention may have a point of zero charge between 1 and 14, preferably greater than about 4, preferably greater than about 6, preferably greater than about 7, preferably greater than about 8, more preferably greater than about 9, and most preferably between about 9 and about 12.

The point of zero charge of activated carbons inversely correlates with their bulk oxygen percentage by weight. Filter particles of the present invention may have a bulk oxygen percentage by weight less than about 5%, preferably less than about 2.5%, preferably less than about 2.3%, preferably less than about 2%, more preferably less than about 1.2%, and most preferably less than about 1%, and/or greater than about 0.1%, preferably greater than about 0.2%, more preferably greater than about 0.25%, and most preferably greater than about 0.3%. Also, the point of zero charge of activated carbon particles correlates with the ORP of the water containing the particles because the point of zero charge is a measure of the ability of the carbon to reduce oxygen (at least for basic carbons). Filter particles of the present invention may have an ORP less than about 570 mV, preferably less than about 465 mV, preferably less than about 400, preferably less than about 360 mV, preferably less than about 325 mV, and most preferably between about 290 mV and about 175 mV.

The electric resistance of the activated carbon filter particles or filter material is one of their important properties as it relates to their ability to form a filter block. For example, a resistive heating method can be used to form filter blocks, wherein a filter material is heated by passing electricity between 2 ends of the filter material. The electric resistance of the filter material will control its ability to heat in a short time. The electric resistance is measured by forming filter blocks using conditions as those mentioned in Examples 3 and 4, supra, and measuring the electric resistance between the 2 faces of the block by contacting them with 2 electrodes from a voltmeter. Exemplary electric resistances of the filters of Examples 3 and 4 are about 350Ω and about 40Ω, respectively. Also, the respective electric resistances of filters made with CARBOCHEM CA-10 of Example 1, supra, and TA4-CA10 of Example 2, supra, are about 1.3 MΩ, and about 100Ω.

Filter particles may be achieved by way of treating a starting material as described herebelow. The treatment conditions may include atmosphere composition, pressure, temperature, and/or time. The atmospheres of the present invention may be reducing or inert. Heating the filter particles in the presence of reducing atmospheres, steam, or inert atmospheres yields filter material with reduced surface oxygen functionality. Examples of suitable reducing atmospheres may include hydrogen, nitrogen, dissociated ammonia, carbon monoxide, and/or mixtures. Examples of suitable inert atmospheres may include argon, helium, and/or mixtures thereof.

The treatment temperature, when the activated carbon particles do not contain any noble metal catalysts (e.g., platinum, gold, palladium) may be between about 600° C. and about 1,200° C., preferably between about 700° C. and about 1,100° C., more preferably between about 800° C. and about 1,050° C., and most preferably between about 900° C. and about 1,000° C. If the activated carbon particles contain noble metal catalysts, the treatment temperature may be between about 100° C. and about 800° C., preferably between about 200° C. and about 700° C., more preferably between about 300° C. and about 600° C., and most preferably between about 350° C. and about 550° C.

The treatment time may be between about 2 minutes and about 10 hours, preferably between about 5 minutes and about 8 hours, more preferably between about 10 minutes and about 7 hours, and most preferably between about 20 minutes and about 6 hours. The gas flow rate may be between about 0.25 standard L/h.g (i.e., standard liters per hour and gram of carbon; 0.009 standard $ft^3$/h.g) and about 60 standard L/h.g (2.1 standard $ft^3$/h.g), preferably between about 0.5 standard L/h.g (0.018 standard $ft^3$/h.g) and about 30 standard L/h.g (1.06 standard $ft^3$/h.g), more preferably between about 1.0 standard L/h.g (0.035 standard $ft^3$/h.g) and about 20 standard L/h.g (0.7 standard $ft^3$/h.g), and most preferably between about 5 standard L/h.g (0.18 standard $ft^3$/h.g) and about 10 standard L/h.g (0.35 standard $ft^3$/h.g). The pressure can be maintained greater than, equal to, or less than atmospheric during the treatment time. As will be appreciated, other processes for producing a mesoporous, basic, and reduced-oxygen activated carbon filter material can be employed. Also, such treatment of a starting material as described above may be repeated multiple times, depending on the starting material, in order to obtain a filter material.

A starting material may be commercially obtained, or may be made by the methods which are well known in the art, as described in, for example, Jagtoyen, M., and F. Derbyshire, Carbon, 36(7-8), 1085-1097 (1998), and Evans, et al., Carbon, 37, 269-274 (1999), and Ryoo et al., J. Phys. Chem. B, 103(37), 7743-7746 (1999), the substances of which are herein incorporated by reference. Typical chemicals used for activation/carbonization include phosphoric acid, zinc chloride, ammonium phosphate, etc., which may be used in combination with the methods described in the two immediately cited journals.

Figure 1B:
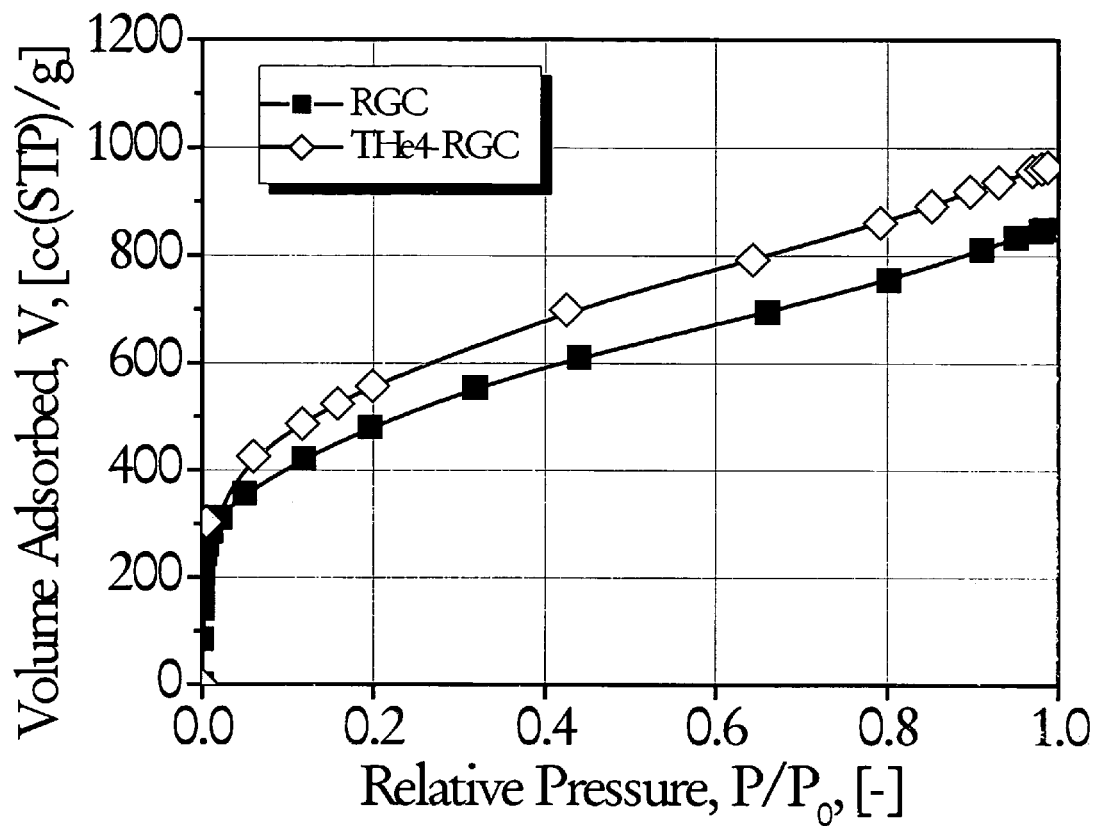
FIG. 1b is a BET nitrogen adsorption isotherm of mesoporous and basic activated carbon particles RGC, and mesoporous, basic, and reduced-oxygen activated carbon THe4-RGC.

The Brunauer, Emmett and Teller (BET) specific surface area and the Barrett, Joyner, and Halenda (BJH) pore size distribution can be used to characterize the pore structure of particles. Preferably, the BET specific surface area of the filter particles may be between about 500 $m^2$/g and about 3,000 $m^2$/g, preferably between about 600 $m^2$/g to about 2,800 $m^2$/g, more preferably between about 800 $m^2$/g and about 2,500 $m^2$/g, and most preferably between about 1,000 $m^2$/g and about 2,000 $m^2$/g. Referring to FIG. 1a, typical nitrogen adsorption isotherms, using the BET process, of a mesoporous, basic, and reduced-oxygen wood-based activated carbon (TA4-CA-10), and a mesoporous and acidic wood-based activated carbon (CA-10) are illustrated. Referring to FIG. 1b, typical nitrogen adsorption isotherms, using the BET process, of a mesoporous and basic wood-based activated carbon (RGC), and a mesoporous, basic, and reduced-oxygen wood-based activated carbon (THe4-RGC) are illustrated.

The total pore volume of the mesoporous and basic activated carbon particles is measured during the BET nitrogen adsorption and is calculated as the volume of nitrogen adsorbed at a relative pressure, $P/P_0$, of 0.9814. More specifically and as is well known in the art, the total pore volume is calculated by multiplying the "volume of nitrogen adsorbed in mL(STP)/g" at a relative pressure of 0.9814 with the conversion factor 0.00156, that converts the volume of nitrogen at STP (standard temperature and pressure) to liquid. The total pore volume of the filter particles may be greater than about 0.4 ML/g, or greater than about 0.7 mL/g, or greater than about 1.3 mL/g, or greater than about 2 mL/g, and/or less than about 3 mL/g, or less than about 2.6 mL/g, or less than about 2 mL/g, or less than about 1.5 mL/g.

The sum of the mesopore and macropore volumes is measured during the BET nitrogen adsorption and calculated as the difference between the total pore volume and the volume of nitrogen adsorbed at $P/P_0$ of 0.15. The sum of the mesopore and macropore-volumes of the filter particles may be greater than about 0.12 mL/g, or greater than about 0.2 mL/g, or greater than about 0.4 mL/g, or greater than about 0.6 mL/g, or greater than about 0.75 mL/g, and/or less than about 2.2 mL/g, or less than about 2 mL/g, or less than about 1.5 mL/g, or less than about 1.2 mL/g, or less than about 1 mL/g.

Figure 2A:
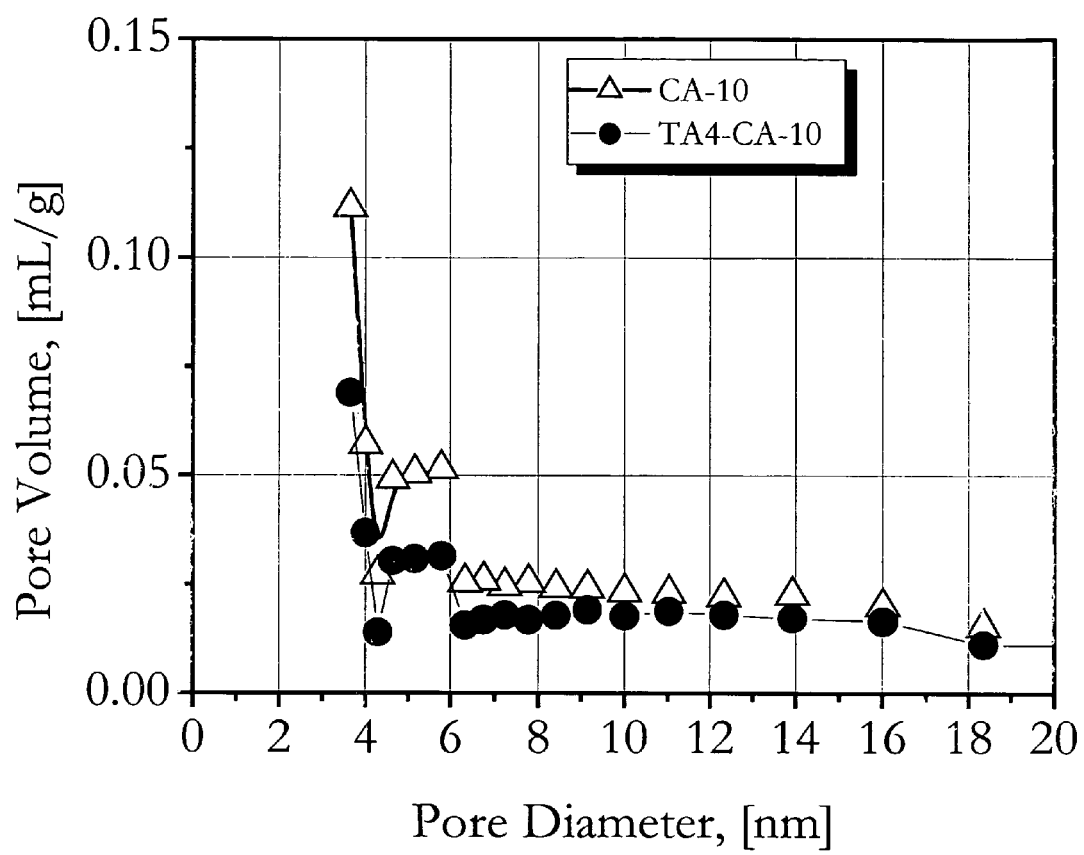
Figure 2B:
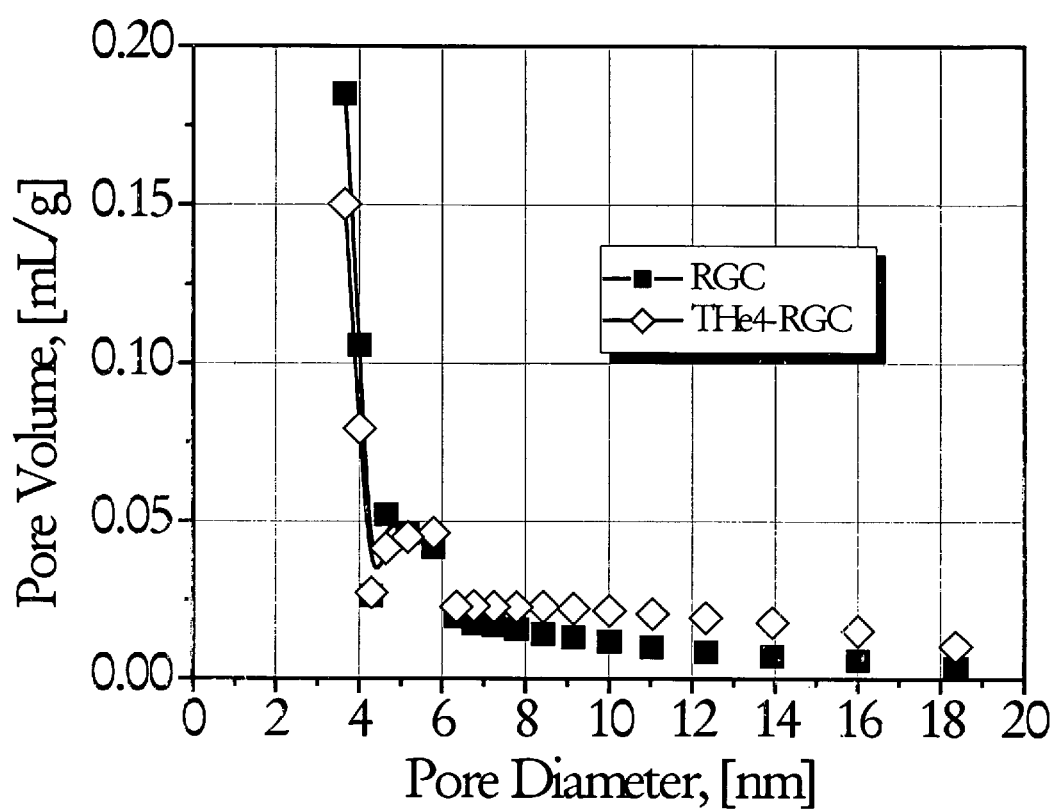
FIG. 2b is a mesopore volume distribution of the particles of FIG. 1b.

The BJH pore size distribution can be measured using the Barrett, Joyner, and Halenda (BJH) process, which is described in J. Amer. Chem. Soc., 73, 373-80 (1951) and Gregg and Sing, ADSORPTION, SURFACE AREA, AND POROSITY, 2nd edition, Academic Press, New York (1982), the substances of which are incorporated herein by reference. In one embodiment, the pore volume may be at least about 0.01 mL/g for any pore diameter between about 4 nm and about 6 nm. In an alternate embodiment, the pore volume may be between about 0.01 mL/g and about 0.04 mL/g for any pore diameter between about 4 nm and about 6 nm. In yet another embodiment, the pore volume may be at least about 0.03 mL/g for pore diameters between about 4 nm and about 6 nm or is between about 0.03 mL/g and about 0.06 mL/g. In a preferred embodiment, the pore volume may be between about 0.015 mL/g and about 0.06 mL/g for pore diameters between about 4 nm and about 6 nm. FIG. 2a illustrates typical mesopore volume distributions, as calculated by the BJH process, of a mesoporous, basic, and reduced-oxygen activated carbon (TA4-CA-10), and a mesoporous and acidic wood-based activated carbon (CA-10). FIG. 2b illustrates typical mesopore volume distributions, as calculated by the BJH process, of a mesoporous and basic wood-based activated carbon (RGC), and a mesoporous, basic, and reduced-oxygen wood-based activated carbon (THe4-RGC).

The ratio of the sum of the mesopore and macropore volumes to the total pore volume may be greater than about 0.3, preferably greater than about 0.4, preferably greater than about 0.6, and most preferably between about 0.7 and about 1.

The total external surface area is calculated by multiplying the specific external surface area by the mass of the filter particles, and is based on the dimensions of the filter particles. For example, the specific external surface area of mono-dispersed (i.e., with uniform diameter) fibers is calculated as the ratio of the area of the fibers (neglecting the 2 cross sectional areas at the ends of the fibers) to the weight of the fibers. Thus, the specific external surface area of the fibers is equal to: 4/ D$\rho$, where D is the fiber diameter and $\rho$ is the fiber density. For monodispersed spherical particles, similar calculations yield the specific external surface area as equal to: 6/ D$\rho$, where D is the particle diameter and $\rho$ is the particle density. For poly-dispersed fibers, spherical or irregular particles, the specific external surface area is calculated using the same respective formulae as above after substituting $\overline{D}_{3,2}$ for D, where $\overline{D}_{3,2}$ is the Sauter mean diameter, which is the diameter of a particle whose surface-to-volume ratio is equal to that of the entire particle distribution. A process, well known in the art, to measure the Sauter mean diameter is by laser diffraction, for example using the Malvern equipment (Malvern Instruments Ltd., Malvern, U.K.). The specific external surface area of the filter particles may be between about 10 cm$^2$/g and about 100,000 cm$^2$/g, preferably between about 50 cm$^2$/g and about 50,000 cm$^2$/g, more preferably between about 100 cm$^2$/g and about 10,000 cm$^2$/g, and most preferably between about 500 cm$^2$/g and about 7,000 cm$^2$/g.

The BRI of the mesoporous, or mesoporous and basic, or mesoporous, basic and reduced-oxygen activated carbon particles, when measured according to the test procedure set forth herein, may be greater than about 99%, preferably greater than about 99.9%, more preferably greater than about 99.99%, and most preferably greater than about 99.999%. Equivalently, the BLRI of the mesoporous, or mesoporous and basic, or mesoporous, basic and reduced-oxygen activated carbon particles may be greater than about 2 log, preferably greater than about 3 log, more preferably greater than about 4 log, and most preferably greater than about 5 log. The VRI of the mesoporous, or mesoporous and basic, or mesoporous, basic and reduced-oxygen activated carbon particles, when measured according to the test procedure set forth herein, may be greater than about 90%, preferably greater than about 95%, more preferably greater than about 99%, and most preferably greater than about 99.9%. Equivalently, the VLRI of the mesoporous, or mesoporous and basic, or mesoporous, basic and reduced-oxygen activated carbon particles may be greater than about 1 log, preferably greater than about 1.3 log, more preferably greater than about 2 log, and most preferably greater than about 3 log.

The steady state, one-dimensional, "clean" bed filtration theory (assuming negligible dispersive transport and desorption of microorganisms) for an axial flow filter (Yao et al., Environ. Sci. Technol. 5, 1102-1112 (1971)), the substance of which is incorporated herein by reference, describes that:

$$C/C_0 = \exp(-\lambda L), \tag{1}$$

where C is the effluent concentration, $C_0$ is the influent concentration, $\lambda$ is the filter coefficient with units of reciprocal length, and L is the depth of the filter. Note that based on the definitions above, the number of collisions that a non-attaching microorganism will experience as it travels over a distance L through the filter will be $(\lambda/\alpha)L$, where $\alpha$ is the "clean" bed sticking coefficient (also called, collision efficiency), defined as the ratio of the number of microorganisms that stick to the collector surface to the number of microorganisms that strike the collector surface. Equation 1 is also valid for radial flow filters if L is substituted by $R_0 - R_i$, where $R_0$ is the outside radius and $R_i$ is the inside radius, and the filter coefficient is averaged over the thickness of the filter. The filter coefficient for a particle-containing bed (not fibers) is as follows:

$$\lambda = (3(1-\epsilon)\eta\alpha)/2d_c, \tag{2}$$

where $\epsilon$ is the filter bed porosity, $\eta$ is the single-collector efficiency, defined as the ratio of the number of microorganisms that strike the collector surface to the number of microorganisms that flow towards the collector surface, and $d_c$ is the collector particle diameter. The factor (3/2) in the formula above is valid for spherical or spherical-like particles. For cylindrical particles (e.g. fibers) the term becomes (4/$\pi$), and $d_c$ is then the diameter of the cylinder. Also, note that the term "clean" bed means that the collector surfaces have not yet accumulated enough microorganisms to cause a reduction in the deposition efficiency of the new microorganisms (i.e., blocking).

Based on the above "clean" bed filtration model, the F-BLR and F-VLR can be calculated as follows:

$$F\text{-}BLR \text{ or } F\text{-}VLR = -\log(C/C_0) = (\lambda L/2.3). \tag{3}$$

The single-collector efficiency, $\eta$, is calculated using the Rajagopalan and Tien model (RT model; AIChE J., 22(3), 523-533 (1976), and AIChE J., 28, 871-872 (1982)) as follows:

$$\eta = 4A_s^{1/3}Pe^{-2/3} + A_sLo^{1/8}R^{15/8} + 0.00338A_sG^{6/5}R^{-2/5}, \tag{4}$$

where $$A_s = \frac{2(1-\gamma^5)}{2-3\gamma+3\gamma^5-2\gamma^6}, \gamma = (1-\varepsilon)^{\frac{1}{3}},$$

Pe is the dimensionless Peclet number $$Pe = \frac{3\mu\pi U d_c d_m}{kT},$$

Lo is the dimensionless London—van der Waals number $$Lo = \frac{4H}{9\pi \mu d_m^2 U},$$

R is the dimensionless interception number $$R = \frac{d_m}{d_c},$$

G is the dimensionless sedimentation number $$G = \frac{g(\rho_m - \rho_f)d_m^2}{18\mu U},$$

$\mu$ is the dynamic fluid viscosity (equal to 1 mPa·s for water), U is the superficial fluid velocity (calculated as: $U=4Q/\pi D^2$, for axial flow filters, where Q is the fluid flowrate, and D is the diameter of the face area of the filter; and $U(R)=Q/2\pi RX$ for radial flow filters, where X is the length of the filter, and R is the radial position between $R_i$ and $R_0$), $d_m$ is the microorganism diameter (or diameter of an equivalent sphere, if the microorganism is non spherical), k is the Boltzmann's constant (equal to $1.38 \times 10^{-23}$ kg·m²/s²·K), T is the fluid temperature, H is the Hamaker constant (it is typically equal to $10^{-20}$ J), g is the gravitational constant (equal to 9.81 m/s²), $\rho_m$ is the density of the microorganisms, and $\rho_f$ is the fluid density (equal to 1 g/mL for water). For the purposes and the materials of the present invention, H is equal to $10^{-20}$ J, T is equal to 298 K, $\rho_m$ is equal to 1.05 g/mL, $\mu$ is equal to 1 mPa·s. Also, for the purposes of the present invention, $d_c$ is the volume median diameter $D_{V,0.5}$, which is the particle diameter such that 50% of the total particle volume is in particles of smaller diameter. Also, the average fluid residence time is calculated as:

$$\tau = \frac{\varepsilon \pi D^2 L}{4Q},$$

for axial flow filters, and $$\tau = \frac{\varepsilon \pi (R_0^2 - R_i^2)X}{Q},$$

for radial flow filters. (5)

The sticking coefficient, $\alpha$, is typically calculated experimentally, for example using the "microbe and radiolabel kinesis" (MARK) technique described in Gross et al. (*Water Res.*, 29(4), 1151-1158 (1995)). The single-collector efficiency, $\eta$, of the filters of the present invention may be greater than about 0.002, preferably greater than about 0.02, preferably greater than about 0.2, preferably greater than about 0.4, more preferably greater than about 0.6, and most preferably between about 0.8 and about 1. The filter coefficient, $\lambda$, of the filters of the present invention may be greater than about 10 m⁻¹, preferably greater than about 20 m⁻¹, more preferably greater than about 30 m⁻¹, most preferably greater than about 40 m⁻¹, and/or less than about 20,000 m⁻¹, preferably less than about 10,000 m⁻¹, more preferably less than about 5,000 m⁻¹, and most preferably less than about 1,000 m⁻¹.

The F-BLR of filters of the present invention containing mesoporous, or mesoporous and basic, or mesoporous, basic, and reduced-oxygen activated carbon particles, when measured according to the test procedure set forth herein, may be greater than about 2 logs, preferably greater than about 3 logs, more preferably greater than about 4 logs, and most preferably greater than about 6 logs. The F-VLR of filters of the present invention containing mesoporous, or mesoporous and basic, or mesoporous, basic, and reduced-oxygen activated carbon particles, when measured according to the test procedure set forth herein, may be greater than about 1 log, preferably greater than about 2 logs, more preferably greater than about 3 logs, and most preferably greater than about 4 logs.

In one preferred embodiment of the present invention, the filter particles comprise mesoporous activated carbon particles that are wood-based activated carbon particles. These particles have a BET specific surface area between about 1,000 m²/g and about 2,000 m²/g, total pore volume between about 0.8 mL/g and about 2 mL/g, and sum of the mesopore and macropore volumes between about 0.4 mL/g and about 1.5 mL/g.

In another preferred embodiment of the present invention, the filter particles comprise mesoporous and basic activated carbon particles that are wood-based activated carbon particles. These particles have a BET specific surface area between about 1,000 m²/g and about 2,000 m²/g, total pore volume between about 0.8 mL/g and about 2 mL/g, and sum of the mesopore and macropore volumes between about 0.4 mL/g and about 1.5 mL/g.

In yet another preferred embodiment of the present invention, the filter particles comprise mesoporous, basic, and reduced-oxygen activated carbon particles that were initially acidic and rendered basic and reduced-oxygen with treatment in a dissociated ammonia atmosphere. These particles are wood-based activated carbon particles. The treatment temperature is between about 925° C. and about 1,000° C., the ammonia flowrate is between about 1 standard L/h.g and about 20 standard L/h.g, and the treatment time is between about 10 minutes and about 7 hours. These particles have a BET specific surface area between about 800 m²/g and about 2,500 m²/g, total pore volume between about 0.7 mL/g and about 2.5 mL/g, and sum of the mesopore and macropore volumes between about 0.21 mL/g and about 1.7 mL/g. A non-limiting example of an acidic activated carbon that is converted to a basic and reduced-oxygen activated carbon is set forth below.

In even yet another preferred embodiment of the present invention, the filter particles comprise mesoporous, basic, and reduced-oxygen activated carbon particles, that were initially mesoporous and basic, with treatment in an inert (i.e., helium) atmosphere. These particles are wood-based activated carbon particles. The treatment temperature is between about 800° C. and about 1,000° C., the helium flowrate is between about 1 standard L/h.g and about 20 standard L/h.g, and the treatment time is between about 10 minutes and about 7 hours. These particles have a BET specific surface area between about 800 m²/g and about 2,500 m²/g, total pore volume between about 0.7 mL/g and about 2.5 mL/g, and sum of the mesopore and macropore volumes between about 0.21 mL/g and about 1.7 mL/g. A non-limiting example of a basic activated carbon that is converted to a basic and reduced-oxygen activated carbon is set forth below.

III. Silver and Silver Containing Materials

It is known that the presence of metals in active carbon can greatly enhance the efficiency and selectivity of the active carbon when it is employed in filtering applications. Specifically, the presence of silver can improve the microbial removal of carbon based water filters. And more specifically, the Bacterial Removal Index (BRI) and the Viral Removal Index (VRI) can both be increased with the incorporation of silver.

Thus, in one preferred aspect, the present invention is directed to a filter for providing potable water. The filter comprises a housing having an inlet and an outlet, and a filter material disposed within said housing formed at least in part from a plurality of mesoporous activated carbon filter particles and particles selected from the group consisting of mesoporous activated carbon filter particles coated entirely with silver or a silver containing material, mesoporous activated carbon filter particles partially coated with silver or a silver containing material, silver particles and mixtures thereof. There is further provided a kit comprising the filter described directly above, and a package for containing the filter. Further, either the package or the filter housing comprises information that the filter or filter material provides: bacterial removal; virus removal; microbial removal; killing of bacteria, killing of viruses, killing of microbials, or any combination of these.

More specifically, the filter material of the present invention can comprise, among other things, an ad-mixture of silver and mesoporous activated carbon filter particles, mesoporous activated carbon filter particles coated partially or entirely with silver and/or a silver containing material; mesoporous activated carbon filter particles coated partially or entirely with silver or a silver containing material; or an ad-mixture of mesoporous activated carbon filter particles, mesoporous activated carbon filter particles coated partially or entirely with silver and/or a silver containing material. Preferably, the weight ratio of the silver or silver-containing material to mesoporous activated carbon filter particles is from about 1:10,000 to about 1:1, based on the weight of the silver or silver-containing material, respectively, and having a BET surface area of at least 800 square meters per gram and a bulk density of at least 0.1 gram per cubic centimeter.

Methods for adding silver to a carbon based matrix are known, and any of these methods are suitable to produce the filter material of the present invention. See for example, U.S. Pat. Nos. 4,482,641 and 4,045,553, issued to Wennerberg, on Nov. 13, 1984, and Mitsumori et al., on Aug. 30, 1977, respectively. See also, Dimitry, U.S. Pat. No. 3,886,093, which discloses activated carbons having uniformly distributed active metal sites and a method for making such activated carbons. The method of Dimitry involves mixing an aqueous solution of a lignin salt with an aqueous solution of a transition metal salt to precipitate the transition metal and lignin as a metal lignate. The transition metal must be capable of forming a chemical bond with the lignin and in so doing precipitating the lignin from solution as a metal lignate. Dimitry discloses that the time required to complete the precipitation is less than one hour and that usually 30 minutes is sufficient for this purpose. According to Dimitry, suitably the wet metal lignate precipitate can then be dried in a spray drier. The precipitate is then carbonized at a temperature between 371° C. and 983° C. and finally activated at a temperature between 760° C. and 1065° C. Dimitry states that, although drying the metal lignate precipitate is not critical to form an activated carbon product, drying is necessary to form a high surface area end product. The Dimitry, Mitsumori et al. and Wennerberg patents are incorporated herein in their entirety by reference.

While not intending to limit the present invention, one method of producing a substantially uniform dispersion of a silver or silver-containing material on a porous carbon matrix comprises: forming a uniform co-crystallite of a precursor of the silver or silver-containing material and of a carbon precursor as defined above; forming a uniform powdered mixture of the co-crystallite and organic solids comprising an alkali metal hydroxide; pyrolizing the powdered mixture in an inert atmosphere at a temperature in the range of from about 400° C. to about 980° C. to form the carbon matrix having the silver or silver-containing material substantially uniformly dispersed therein; and separating unreacted inorganic material and inorganic reaction products other than the dispersed silver or silver-containing material from the porous carbon matrix.

Any of a variety of known techniques can be employed to form the co-crystallite in the method of this invention which affords uniform co-crystallization, that is, simultaneous crystallization, of the carbon precursor and the precursor of the silver or silver-containing material and the formation of a substantially uniform co-crystallite thereof. Homogeneity of the co-crystallite mixture is essential to the ultimate formation of a uniform dispersion of the silver or silver-containing material in high surface area active carbon. A preferred technique to form the uniform co-crystallite of the carbon precursor and precursor of the silver or silver-containing material in the method of this invention involves the formation of a stable solution of both such precursors in a suitable solvent and spray drying such solution to dryness. In such technique, solvent removal must be carried out rapidly enough to maximize rapid, simultaneous and homogeneous co-crystallization of both precursors from solution. Spray drying provides the desired rapid evaporation to insure rapid, simultaneous and uniform co-crystallization and formation of a homogeneous co-crystallite of both precursors.

In a spray drying system which is suitable for use in carrying out the spray drying step to produce the filter material of this invention, a solution of the carbon precursor and of the precursor of the silver or silver-containing material is introduced into a drying chamber through a nozzle. A hot inert gas such as nitrogen is introduced into the drying chamber through a line which surrounds the nozzle and serves to assist in atomizing the solution entering the drying chamber through the nozzle, to accelerate and raise the temperature of the atomized solution droplets and thereby to promote substantially instantaneous evaporation of solvent therefrom to afford a homogeneous co-crystallite powder. Air is introduced into the drying chamber to sweep the co-crystallite powder and nitrogen downward in the drying chamber where the bulk of the co-crystallite powder falls to the bottom of the drying chamber, where it collects and from which it is later removed for use in the subsequent steps of the method of this invention. Gas passes from the drying chamber and then to a cyclone system where co-crystallite powder entrained in the gas stream is separated from the gas and passes downward through a line for collection. The weight ratio of the dispersed metal or metal-containing material-to-the active carbon matrix in the composition of this invention is preferably from 1:10,000 to 1:1, based on the weight of the metal or metal-containing material, respectively.

IV. Treatment Examples

EXAMPLE 1

Treatment of a Mesoporous and Acidic Activated Carbon To Produce a Mesoporous, Basic, and Reduced-Oxygen Activated Carbon About 2 kg of the CARBOCHEM® CA-10 mesoporous and acidic wood-based activated carbon particles from Carbochem, Inc., of Ardmore, Pa., are placed on the belt of a furnace Model BAC-M manufactured by C.I. Hayes, Inc., of Cranston, R.I. The furnace temperature is set to about 950° C., the treatment time is about 4 hours, and the atmosphere is dissociated ammonia flowing with a volumetric flowrate of about 12,800 standard L/h (i.e., about 450 standard ft$^3$/h, or equivalently, about 6.4 standard L/h.g). The treated activated carbon particles are called TA4-CA-10, and their BET isotherm, mesopore volume distribution, and point of zero charge analyses are illustrated in FIGS. 1$a$, 2$a$, and 3$a$, respectively. Numerical values for BET, the sum of mesopore and macropore volumes, point of zero charge, BRI/BLRI, VRI/VLRI, bulk oxygen percentage by weight, and ORP are shown in Section VII.

EXAMPLE 2

Treatment of a Mesoporous and Basic Activated Carbon to Produce a Mesoporous, Basic, and Reduced-oxygen Activated Carbon About 2 kg of the MeadWestvaco Nuchar® RGC mesoporous and basic wood-based activated carbon particles from MeadWestvaco Corp., of Covington, Va., are placed on the belt of a furnace Model BAC-M manufactured by C.I. Hayes, Inc., of Cranston, R.I. The furnace temperature is set to about 800° C., the treatment time is 4. hours, and the atmosphere is helium flowing with a volumetric flowrate of about 12,800 standard L/h (i.e., about 450 standard ft$^3$/h, or equivalently, about 6.4 standard L/h.g). The treated activated carbon particles are called THe4-RGC, and their BET isotherm, mesopore volume distribution, and point of zero charge analyses are illustrated in FIGS. 1$b$, 2$b$, and 3$b$, respectively. Numerical values for BET, the sum of mesopore and macropore volumes, point of zero charge, BRI/BLRI, VRI/VLRI, bulk oxygen percentage by weight, and ORP are shown in Section VII.

V. Filters of the Present Invention

Figure 4:
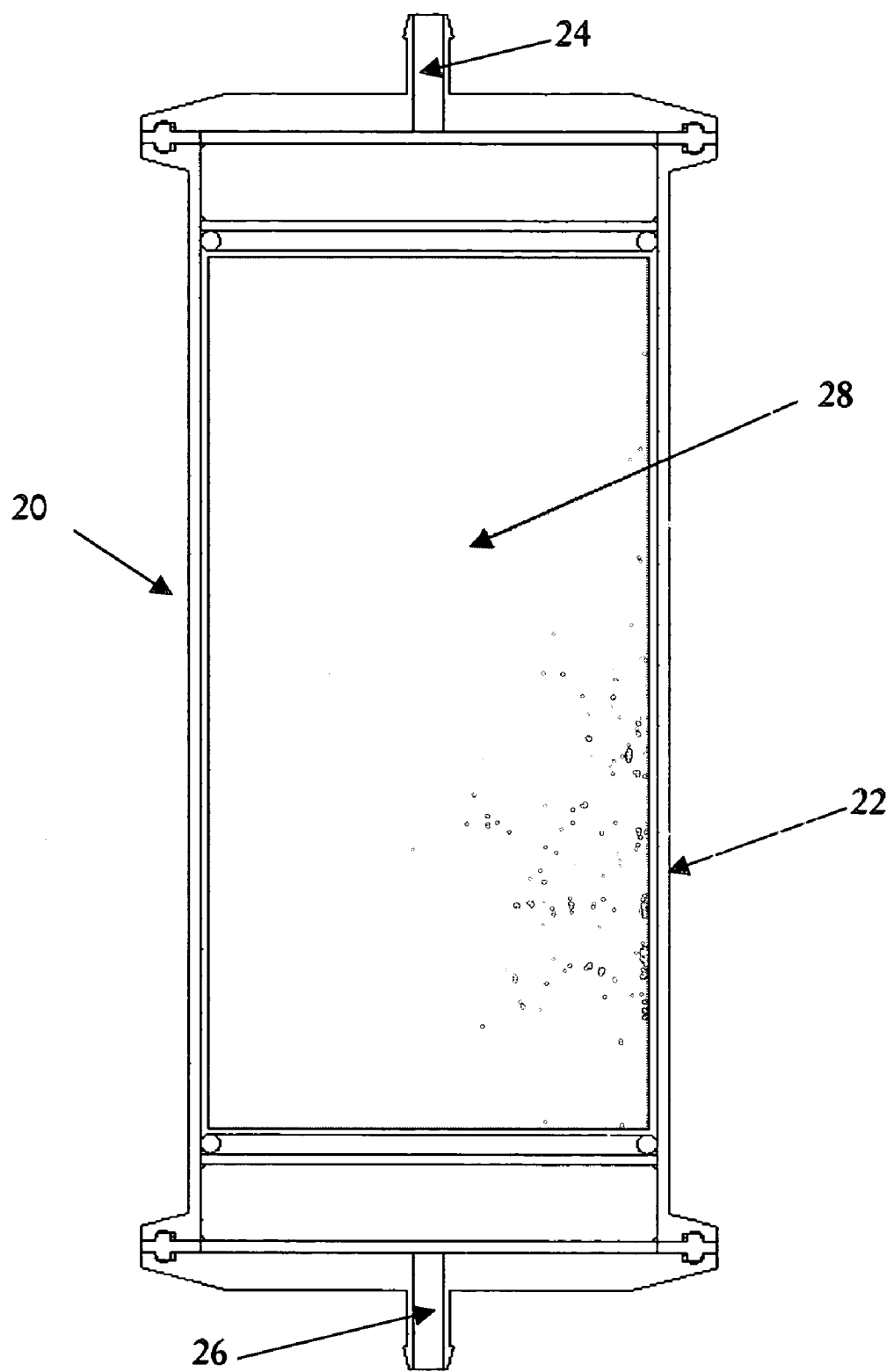
FIG. 4 is a cross sectional side view of an axial flow filter made in accordance with the present invention.

Referring to FIG. 4, an exemplary filter made in accordance with the present invention will now be described. The filter 20 comprises a housing 22 in the form of a cylinder having an inlet 24 and an outlet 26. The housing 22 can be provided in a variety of forms, shapes, sizes, and arrangements depending upon the intended use and desired performance of the filter 20, as known in the art. For example, the filter 20 can be an axial flow filter, wherein the inlet 24 and outlet 26 are disposed so that the liquid flows along the axis of the housing 22. Alternatively, the filter 20 can be a radial flow filter wherein the inlet 24 and outlet 26 are arranged so that the fluid (e.g., either a liquid, gas, or mixture thereof) flows along a radial of the housing 22. Either in axial or radial flow configuration, filter 20 may be preferably configured to accommodate a face area of at least about 0.5 in.$^2$ (3.2 cm$^2$), more preferably at least about 3 in.$^2$ (19.4 cm$^2$), and most preferably at least about 5 in.$^2$ (32.2 cm$^2$), and preferably a filter depth of at least about 0.125 in. (0.32 cm) of at least about 0.25 in. (0.64 cm), more preferably at least about 0.5 in. (1.27 cm), and most preferably at least about 1.5 in. (3.81 cm). For radial flow filters, the filter length may be at least 0.25 in. (0.64 cm), more preferably at least about 0.5 in. (1.27 cm), and most preferably at least about 1.5 in. (3.81 cm). Still further, the filter 20 can include both axial and radial flow sections.

The housing may also be formed as part of another structure without departing from the scope of the present invention. While the filters of the present invention are particularly suited for use with water, it will be appreciated that other fluids (e.g., air, gas, and mixtures of air and liquids) can be used. Thus, the filter 20 is intended to represent a generic liquid filter or gas filter. The size, shape, spacing, alignment, and positioning of the inlet 24 and outlet 26 can be selected, as known in the art, to accommodate the flow rate and intended use of the filter 20. Preferably, the filter 20 is configured for use in residential or commercial potable water applications, including, but not limited to, whole house filters, refrigerator filters, portable water units (e.g., camping gear, such as water bottles), faucet-mount filters, under-sink filters, medical device filters, industrial filters, air filters, etc. Examples of filter configurations, potable water devices, consumer appliances, and other water filtration devices suitable for use with the present invention are disclosed in U.S. Pat. Nos. 5,527,451, 5,536,394, 5,709,794, 5,882,507, 6,103,114, 4,969,996, 5,431,813, 6,214,224, 5,957,034, 6,145,670, 6,120,685, and 6,241,899, the substances of which are incorporated herein by reference. For potable water applications, the filter 20 may be preferably configured to accommodate a flow rate of less than about 8 L/min, or less than about 6 L/min, or between about 2 L/min and about 4 L/min, and the filter may contain less than about 2 kg of filter material, or less than about 1 kg of filter material, or less than about 0.5 kg of filter material. Further, for potable water applications, the filter 20 may be preferably configured to accommodate an average fluid residence time of at least about 3 s, preferably at least about 5 s, preferably at least about 7 s, more preferably at least about 10 s, and most preferably at least about 15 s. Still further, for potable water applications, the filter 20 may be preferably configured to accommodate a filter material pore volume of at least about 0.4 cm$^3$, preferably at least about 4 cm$^3$, more preferably at least about 14 cm$^3$, and most preferably at least about 25 cm$^3$.

The filter 20 also comprises a filter material 28 which may be used in combination with other filter systems including reverse osmosis systems, ultra-violet light systems, ionic exchange systems, electrolyzed water systems, and other water treatment systems known to those with skill in the art.

The filter 20 also comprises a filter material 28, wherein the filter material 28 includes one or more filter particles (e.g., fibers, granules, etc.). One or more of the filter particles can be mesoporous, more preferably mesoporous and basic, and most preferably mesoporous, basic and reduced oxygen and possess the characteristics previously discussed. The mesoporous; or mesoporous and basic; or mesoporous, basic and reduced oxygen activated carbon filter material 28 can be coated either partially or in its entirety with silver, a silver containing material, or combinations thereof. The mesoporous; or nesoporotis and basic; or mesoporous, basic and reduced oxygen activated carbon filter material 28 can be combined with other materials selected from the group consisting of activated carbon powders, activated carbon granules, activated carbon fibers, zeolites, activatied alumina, activated magnesia, diatomaceous earth, silver particles, activated silica, hydrotalcites, glass, polyethylene fibers, polypropylene fibers, ethylene maleic anhydride copolymers fibers, sand, clay and mixtures thereof. The other materials can be coated either partially or in their entirety with silver, a silver containing material, or combinations thereof. Examples of filter materials and combinations of filter materials that mesoporous and basic activated carbon may be combined with are disclosed in U.S. Pat. Nos. 6,274,041, 5,679,248, which are herein incorporated by reference, and U.S. patent application Ser. No. 09/628,632, which is herein incorporated by reference. As previously discussed, the filter material can be provided in either a loose or interconnected form (e.g., partially or wholly bonded by a polymeric binder or other means to form an integral structure).

The filter material may be used for different applications (e.g., use as a pre-filter or post-filter) by varying the size, shape, complex formations, charge, porosity, surface structure, functional groups, etc. of the filter particles as discussed above. The filter material may also be mixed with other materials, as just described, to suit it for a particular use. Regardless of whether the filter material is mixed with other materials, it may be used as a loose bed, a block (including a co-extruded block as described in U.S. Pat. No. 5,679,248, which is herein incorporated by reference), and mixtures thereof. Preferred methods that might be used with the filter material include forming a block filter made by ceramic-carbon mix (wherein the binding comes from the firing of the ceramic), using powder between non-wovens as described in U.S. Pat. No. 6,077,588, which is herein incorporated by reference, using the green strength method as described in U.S. Pat. No. 5,928,588, which is herein incorporated by reference, activating the resin binder that forms the block, which is herein incorporated by reference, or by using a resistive heating method as described in PCT Application Serial No. WO 98/43796.

VI. Filter Examples

EXAMPLE 3

Filter Containing Mesoporous and Basic Activated Carbon Particles

About 18.3 g of Nuchar® RGC mesoporous and basic activated carbon powder (with $D_{V,0.5}$ equal to about 45 µm) from MeadWestvaco Corp. of Covington, Va., is mixed with about 7 g of Microthene® low-density polyethylene (LDPE) FN510-00 binder of Equistar Chemicals, Inc. of Cincinnati, Ohio, and about 2 g of Alusil® 70 aluminosilicate powder from Selecto, Inc., of Norcross, Ga. The mixed powders are then poured into a circular aluminum mold with about 3 in. (about 7.62 cm) internal diameter and about 0.5 in. (about 1.27 cm) depth. The mold is closed and placed in a heated press with platens kept at about 204° C. for 1 h. Then, the mold is allowed to cool to room temperature, opened, and the axial flow filter is removed. The characteristics of the filter are: face area: about 45.6 cm²; filter depth: about 1.27 cm; filter total volume: about 58 mL; filter porosity (for pores greater than about 0.1 µm): about 0.43; and filter material pore volume (for pores greater than about 0.1 µm): about 25 mL (as measured by mercury porosimetry). The filter is placed in the Teflon® housing described in the test procedures below. When the flow rate is about 200 mL/min, the pressure drop of this filter is about 17 psi (about 1.2 bar, 0.12 MPa) for about the first 2,000 filter pore volumes. Numerical values for F-BLR, F-VLR, η, and α are shown in Section VII.

EXAMPLE 4

Filter Containing Microporous and Basic Activated Carbon Particles

About 26.2 g of coconut microporous and basic activated carbon powder (with $D_{V,0.5}$ equal to about 92 µm) is mixed with 7 g of Microthene® low-density polyethylene (LDPE) FN510-00 binder of Equistar Chemicals, Inc. of Cincinnati, Ohio, and about 2 g of Alusil® 70 aluminosilicate powder from Selecto, Inc., of Norcross, Ga. The mixed powders are then poured into a circular aluminum mold with about 3 in. (about 7.62 cm) internal diameter and about 0.5 in. (about 1.27 cm) depth. The mold is closed and placed in a heated press with platens kept at about 204° C. for 1 h. Then, the mold is allowed to cool to room temperature, is opened, and the axial flow filter is removed. The characteristics of the filter are: face area: about 45.6 cm²; filter depth: about 1.27 cm; filter total volume: about 58 mL; filter porosity (for pores greater than about. 0.1 µm): about 0.44; and filter material pore volume (for pores greater than about 0.1 µm): about 25.5 mL (as measured by mercury porosimetry). The filter is placed in the Teflon® housing described in the test procedures below. When the flow rate is about 200 mL/min, the pressure drop of this filter is about 17 psi (about 1.2 bar, about 0.12 MPa) for about the first 2,000 filter pore volumes. Numerical values for F-BLR, F-VLR, η, and α are shown in Section VII.

VII. Test and Calculation Procedures

The following test procedures are used to calculate the BET, point of zero charge, BRI/BLRI, VRI/VLRI, bulk oxygen percentage by weight, ORP, F-BLR, and F-VLR values discussed herein. Also discussed herein are calculation procedures for single-collector efficiency, filter coefficient, average fluid residence time, and F-BLR.

While measurement of the BRI/BLRI and VRI/VLRI values is with respect to an aqueous medium, this is not intended to limit the ultimate use of filter materials of the present invention, but rather the filter materials can ultimately be used with other fluids as previously discussed even though the BRI/BLRI and VRI/VLRI values are calculated with respect to an aqueous medium. Further, the filter materials chosen below to illustrate use of the test procedures are not intended to limit the scope of the manufacture and/or composition of the filter materials of the present invention or to limit which filter materials of the present invention can be evaluated using the test procedures.

BET Test Procedure

The BET specific surface area and pore volume distribution are measured using a nitrogen adsorption technique, such as that described in ASTM D 4820-99, the substance of which is herein incorporated by reference, by multipoint nitrogen adsorption, at about 77K with a Coulter SA3100 Series Surface. Area and Pore Size Analyzer manufactured by Coulter Corp., of Miami, Fla. This process can also provide the micropore, mesopore, and macropore volumes. For the TA4-CA-10 filter particles of Example 1, the BET area is about 1,038 m²/g, micropore volume is about 0.43 mL/g, and the sum of the mesopore and macropore volumes is about 0.48 mL/g. For the THe4-RGC filter particles of Example 2, the BET area is about 2,031 m²/g, micropore volume is about 0.81 mL/g, and the sum of the mesopore and macropore volumes is about 0.68 mL/g. Note that the respective values of the starting materials CA-10 and RGC are: about 1,309 m²/g; about 0.54 mL/g; about 0.67 mL/g; and about 1,745 m²/g; about 0.70 mL/g; about 0.61 mL/g, respectively. Typical BET nitrogen isotherm and the mesopore volume distribution for the filter material of Examples 1 and 2 are illustrated in FIGS. 1a and 1b, respectively. As will be appreciated, other instrumentation can be substituted for the BET measurements as is known in the art.

Point of Zero Charge Test Procedure

Figure 3A:
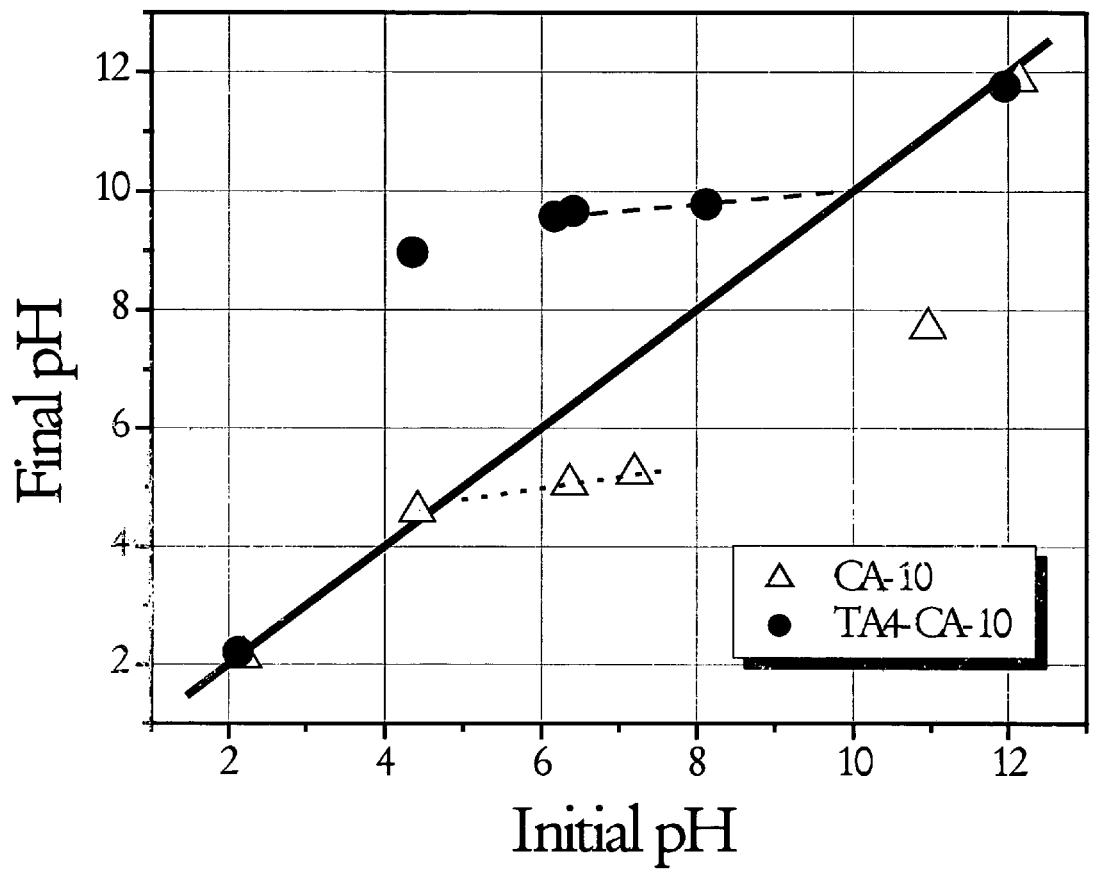
Figure 3B:
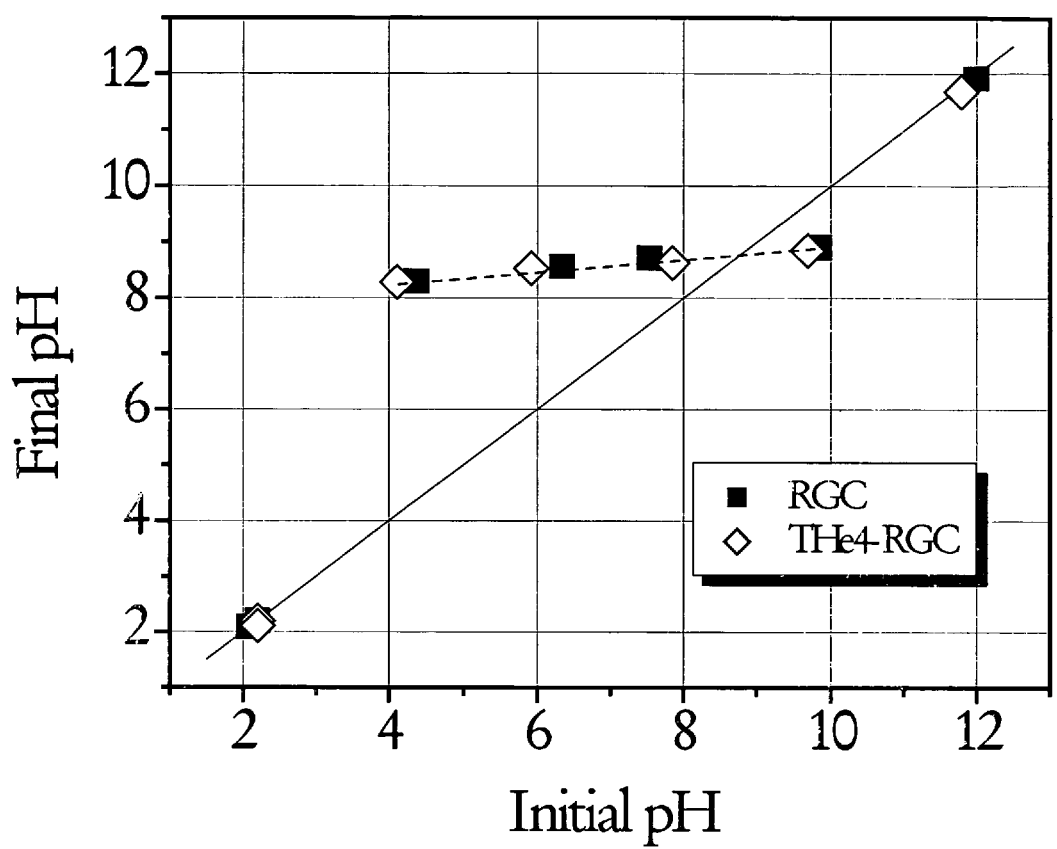
FIG. 3b is a point-of-zero-charge graph of the particles of FIG. 1b.

About 0.010 M aqueous KCl solution is prepared from reagent grade KCl and water that is freshly distilled under argon gas. The water used for the distillation is deionized by a sequential reverse osmosis and ion exchange treatment. About 25.0 mL volume of the aqueous KCl solution is transferred into six, about 125 mL flasks, each fitted with a 24/40 ground glass stopper. Microliter quantities of standardized aqueous HCl or NaOH solutions are added to each flask so that the initial pH ranges between about 2 and about 12. The pH of each flask is then recorded using an Orion model 420A pH meter with an Orion model 9107BN Triode Combination pH/ATC electrode, manufactured by Thermo Orion Inc., of Beverly, Mass., and is called "initial pH". About 0.0750±0.0010 g of activated carbon particles are added to each of the six flasks, and the aqueous suspensions are stirred (at about 150 rpm) while stoppered for about 24 hours at room temperature before recording the "final pH". FIG. 3a shows the initial and final pH values for the experiments run with CA-10, and TA4-CA-10 activated carbon materials, and FIG. 3b shows the initial and final pH values for the experiments run with RGC and THe4-RGC activated carbon materials. The point of zero charge for the CA-10, TA4-CA-10, RGC, and THe4-RGC is about 5.0, about 9.7, about 8.8, and about 8.6, respectively. As will be appreciated, other instrumentation can be substituted for this test procedure as is known in the art.

BRI/BLRI Test Procedure

A PB-900™ Programmable JarTester manufactured by Phipps & Bird, Inc., of Richmomd, Va., with 2 or more Pyrex® glass beakers (depending on the numbers of materials tested) is used. The diameter of the beakers is about 11.4 cm (about 4.5") and the height is about 15.3 cm (about 6"). Each beaker contains about 500 mL of dechlorinated, municipally-supplied tap water contaminated with the $E.$ $coli$ microorganisms and a stirrer that is rotated at about 60 rpm. The stirrers are stainless steel paddles about 7.6 cm (about 3") in length, about 2.54 cm (about 1") in height, and about 0.24 cm (about $3/32$") in thickness. The stirrers are placed about 0.5 cm (about $3/16$") from the bottom of the beakers. The first beaker contains no filter material and is used as a control, and the other beakers contain sufficient quantity of the filter materials, having a Sauter mean diameter less than about 55 μm, so that the total external geometric surface area of the materials in the beakers is about 1400 cm². This Sauter mean diameter is achieved by a) sieving samples with broad size distribution and higher Sauter mean diameter or b) reducing the size of the filter particles (e.g., if the filter particles are larger than about 55 μm or if the filter material is in an integrated or bonded form) by any size-reducing techniques that are well known to those skilled in the art. For example, and by no way of limitation, size-reducing techniques are crushing, grinding, and milling. Typical equipment that is used for size reduction includes jaw crushers, gyratory crushers, roll crushers, shredders, heavy-duty impact mills, media mills, and fluid-energy mills, such as centrifugal jets, opposed jets or jets with anvils. The size reduction can be used on loose or bonded filter particles. Any biocidal coating on the filter particles or the filter material should be removed before conducting this test. Alternatively, uncoated filter particles can be substituted for this test.

Duplicate samples of water, each about 5 mL in volume, are collected from each beaker for assay at various times after insertion of the filter particles in the beakers until equilibrium is achieved in the beakers that contain the filter particles. Typical sample times are: about 0, about 2, about 4 and about 6 hours. Other equipment can be substituted as known in the art.

The $E.$ $coli$ bacteria used are the ATCC # 25922 (American Type Culture Collection, Rockville, Md.). The target $E.$ $coli$ concentration in the control beaker is set to be about $3.7 \times 10^9$ CFU/L. The $E.$ $coli$ assay can be conducted using the membrane filter technique according to process # 9222 of the 20$^{th}$ edition of the "*Standard Processes for the Examination of Water and Wastewater*" published by the American Public Health Association (APHA), Washington, D.C., the substance of which is herein incorporated by reference. The limit of detection (LOD) is about $1 \times 10^3$ CFU/L.

Figure 5A:
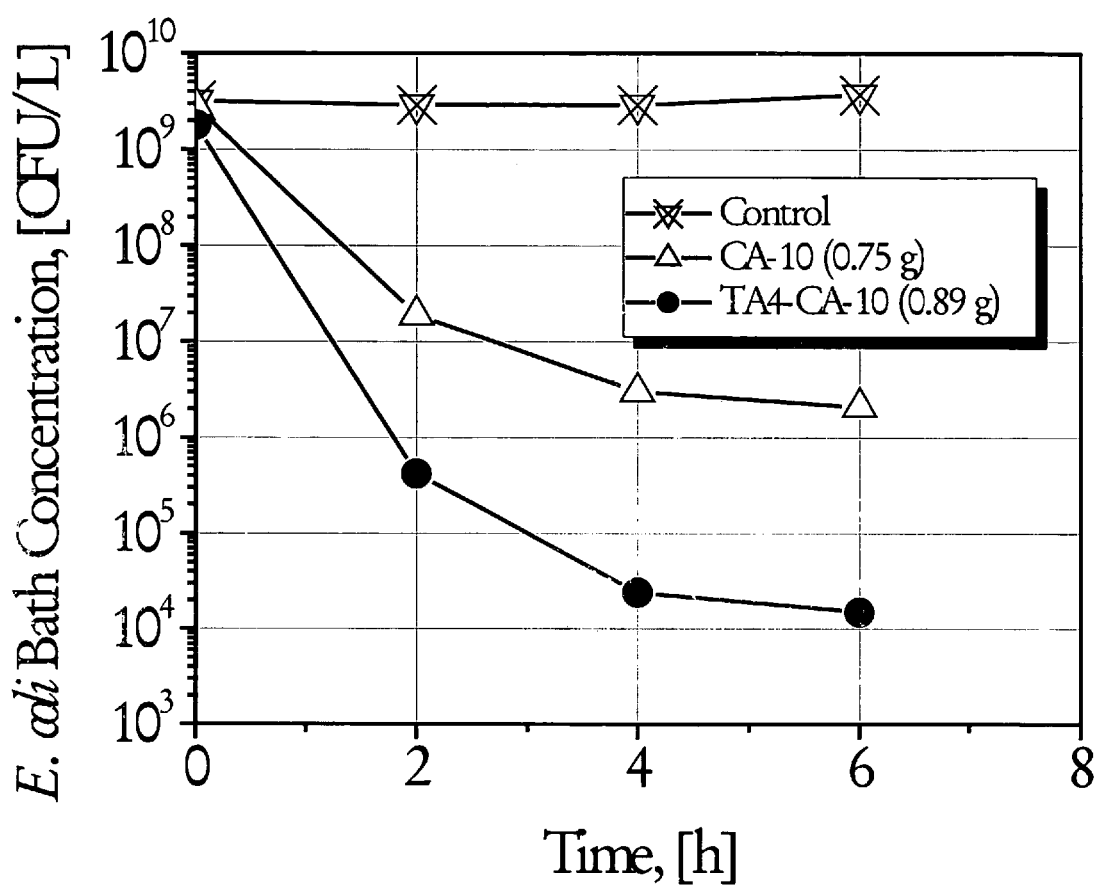
Figure 5B:
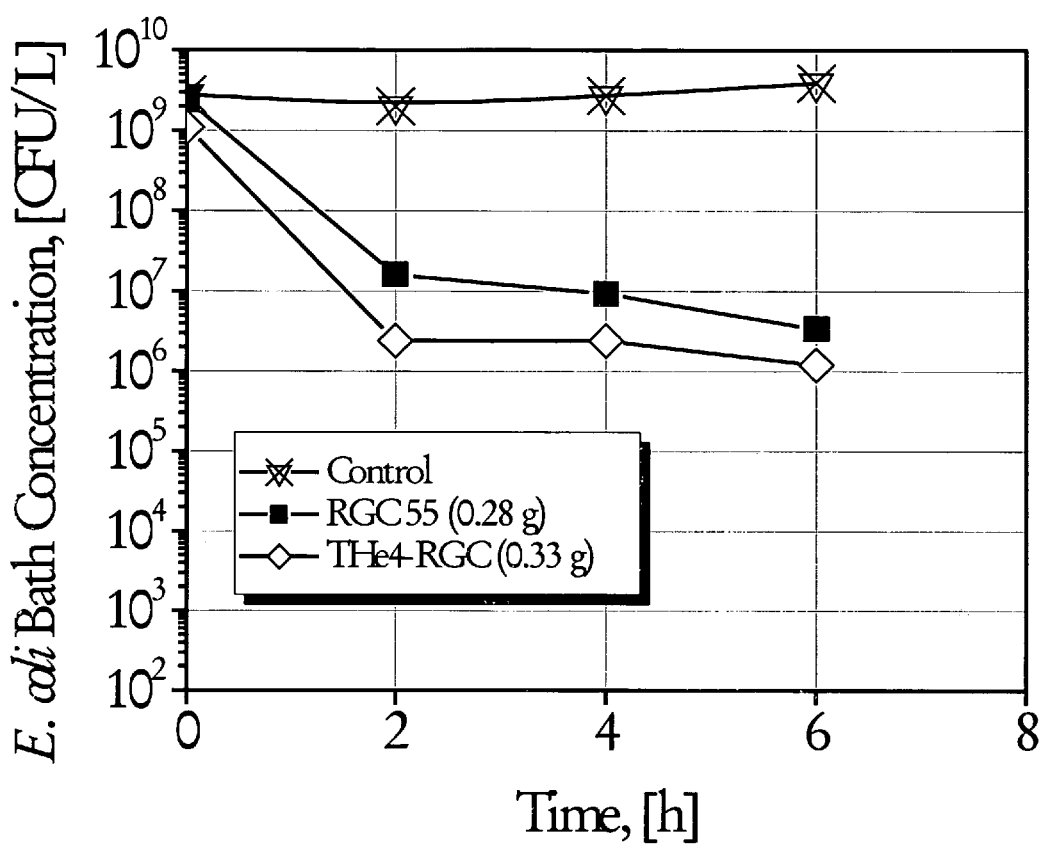
FIG. 5b illustrates the E. coli bath concentration as a function of time for activated carbon particles of FIG. 1b.

Exemplary BRI/BLRI results for the filter materials of Examples 1 and 2 are shown in FIG. 5a and FIG. 5b. The amount of the CA-10 mesoporous and acidic activated carbon material is about 0.75 g, and that of the TA40-CA-10 mesoporous, basic, and reduced-oxygen activated carbon material is about 0.89 g. The amount of the RGC mesoporous and basic activated carbon material is about 0.28 g, and that of the THe4-RGC mesoporous, basic, and reduced-oxygen activated carbon material is about 0.33 g. All four amounts correspond to about 1,400 cm² external surface area. The $E.$ $coli$ concentration in the control beaker in FIG. 5a is about $3.7 \times 10^9$ CFU/L, and that in FIG. 5b is about $3.2 \times 10^9$ CFU/L. The $E.$ $coli$ concentrations in the beakers containing the CA-10, TA4-CA-10, RGC, and THe4-RGC samples reach equilibrium in about 6 hours, and their values are: about $2.1 \times 10^6$ CFU/L, about $1.5 \times 10^4$ CFU/L, about $3.4 \times 10^6$ CFU/L, and about $1.2 \times 10^6$ CFU/L, respectively. Then, the respective BRIs are calculated as about 99.94%, about 99.9996%, about 99.91%, and about 99.97%, and the respective BLRIs are calculated as about 3.2 log, about 5.4 log, about 3.0 log, and about 3.5 log.

VRI/VLRI Test Procedure

The testing equipment and the procedure are the same as in BRI/BLRI procedure. The first beaker contains no filter material and is used as control, and the other beakers contain a sufficient quantity of the filter materials, having a Sauter mean diameter less than about 55 μm, so that there is a total external geometric surface area of about 1400 cm² in the beakers. Any biocidal coating on the filter particles or the filter material should be removed before conducting this test. Alternatively, uncoated filter particles or filter material can be substituted for this test.

The MS-2 bacteriophages used are the ATCC # 15597B from the American Type Culture Collection of Rockville, Md. The target MS-2 concentration in the control beaker is set to be about $2.07 \times 10^9$ PFU/L. The MS-2 can be assayed according to the procedure by C. J. Hurst, *Appl. Environ. Microbiol.*, 60(9), 3462(1994), the substance of which is herein incorporated by reference. Other assays known in the art can be substituted. The limit of detection (LOD) is about $1 \times 10^3$ PFU/L.

Figure 6A:
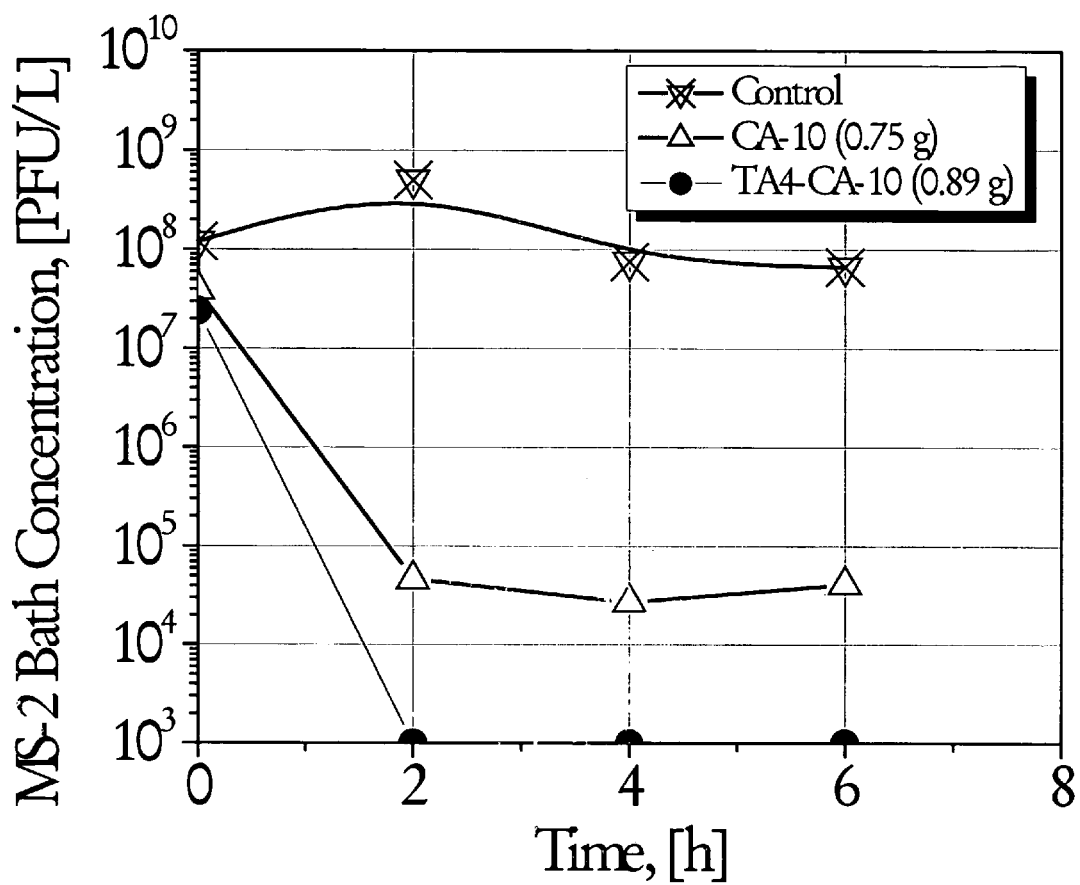
Figure 6B:
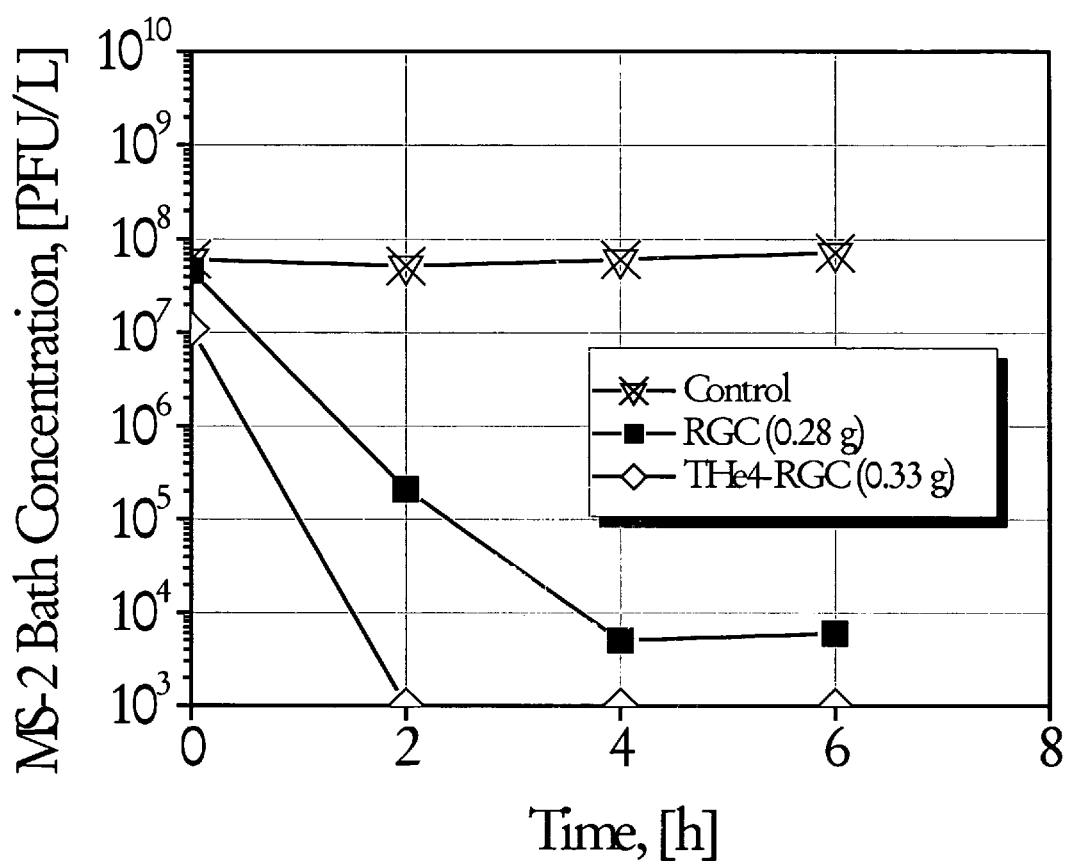
FIG. 6b illustrates the MS-2 bath concentration as a function of time for the activated carbon particles of FIG. 1b.

Exemplary VRI/VLRI results for the filter materials of Examples 1 and 2 are shown in FIG. 6a and FIG. 6b. The amount of the CA-10 mesoporous and acidic activated carbon material is about 0.75 g, and that of the TA40-CA-10 mesoporous, basic, and reduced-oxygen activated carbon material is about 0.89 g. The amount of the RGC mesoporous and basic activated carbon material is about 0.28 g, and that of the THe4-RGC mesoporous, basic, and reduced-oxygen activated carbon material is about 0.33 g. All four amounts correspond to about 1,400 cm² external surface area. The MS-2 concentration in the control beaker in FIG. 6a is about 6.7×10⁷ PFU/L, and that in FIG. 6b is about 8.0×10⁷ PFU/L. The MS-2 concentrations in the beakers containing the CA-10, TA4-CA-10, RGC, and THe4-RGC samples reach equilibrium in 6 hours, and their values are about 4.1×10⁴ PFU/L, about 1×10³ PFU/L, about 3×10³ PFU/L, and less than about 1.0×10³ PFU/L (limit of detection), respectively. Then, the respective VRIs are calculated as about 99.94%, about 99.999%, about 99.996%, and >about 99.999%, and the respective VLRIs are calculated as about 3.2 log, about 5 log, about 4.4 log, and >about 5 log.

Bulk Oxygen Percentage by Weight Test Procedure

The bulk oxygen percentage by weight is measured using the PerkinElmer Model 240 Elemental Analyzer (Oxygen Modification; PerkinElmer, Inc.; Wellesley, Mass.). The technique is based on pyrolysis of the sample in a stream of helium at about 1000° C. over platinized carbon. The carbon samples are dried overnight in a vacuum oven at about 100° C. As will be appreciated, other instrumentation can be substituted for this test procedure as is known in the art. Exemplary bulk oxygen percentage by weight values for the filter materials CA-10, TA4-CA-10, RGC and THe4-RGC are about 8.3%, about 1.1%, about 2.3% and about 0.8%, respectively.

ORP Test Procedure

The ORP is measured using the platinum redox electrode Model 96-78-00 from Orion Research, Inc. (Beverly, Mass.), and following the ASTM standard D 1498-93. The procedure involves the suspension of about 0.2 g of carbon in about 80 mL of tap water, and reading the electrode reading, in mV, after about 5 min of gentle stirring. As will be appreciated, other instrumentation can be substituted for this test procedure as is known in the art. Exemplary ORP values for the filter materials CA-10, TA4-CA-10, RGC and THe4-RGC are about 427 mV, about 285 mV, about 317 mV, and about 310 mV, respectively.

F-BLR Test Procedure

The housings for the axial flow filters with mesoporous carbon are made from Teflon® and consist of 2 parts, i.e., a lid and a base. Both parts have an outside diameter of about 12.71 cm (about 5") and inside diameter of about 7.623 cm (about 3"). The lid counter sets in the base with an o-ring (about 3" ID and about 1/8" thickness) compression seal. The inlet and outlet hose barb connectors are threaded into the lid and base with about 1/16" NPT pipe threads. About 1/2" thick by about 2¾" OD stainless steel diverter (with about 3/16" hole on the upstream side and about 6 mesh screen on the downstream side) is counter set into the lid of the housing. The function of the diverter is to distribute the inlet flow over the entire face of the filter. The lid and base of the housing engage such that a compression seal exists sealing the filter within the housing. The lid and the base held together using four about ¼" fasteners.

The filter is mounted inside the housing and water contaminated with about 1×10⁸ CFU/L E. coli flows through at a flowrate of about 200 mL/min. The total amount of water flowing in can be about 2,000 filter material pore volumes or more. The E. coli bacteria used are the ATCC # 25922 (American Type Culture Collection, Rockville, Md.). The E. coli assay can be conducted using the membrane filter technique according to process # 9222 of the 20$^{th}$ edition of the "Standard Processes for the Examination of Water and Wastewater" published by the American Public Health Association (APHA), Washington, D.C., the substance of which is herein incorporated by reference. Other assays known in the art can be substituted (e.g. COLILERT®). The limit of detection (LOD) is about 1×10² CFU/L when measured by the membrane filter technique, and about 10 CFU/L when measured by the COLILERT® technique. Effluent water is collected after the flow of about the first 2,000 filter material pore volumes, assayed to count the E. coli bacteria present, and the F-BLR is calculated using the definition.

Figure 7A:
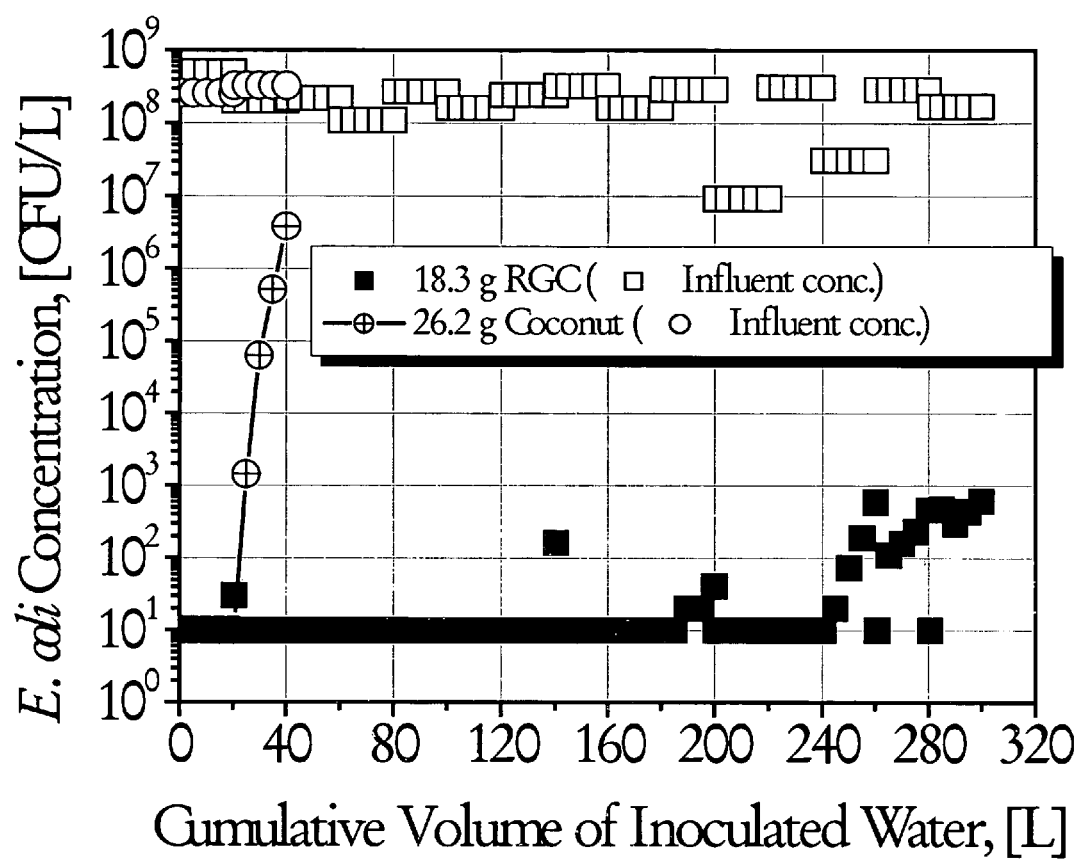
FIG. 7a illustrates the E. coli flow concentration as a function of the cumulative volume of water through 2 filters; one containing RGC mesoporous and basic activated carbon, and the other containing coconut microporous activated carbon particles.

Exemplary results used to calculate F-BLR are shown in FIG. 7a for the axial flow filters of Example 3 and Example 4. The flowrate used in FIG. 7a is about 200 mL/min and the influent concentration of E. coli varied between about 1×10⁸ and about 1×10⁹ CFU/L. The filters are challenged with about 20 L once a week (every Tuesday) and the effluent water is assayed as described above. The average fluid residence time for the RGC filter is about 7.5 s, and that of the coconut filter is about 7.65 s. The F-BLR of the RGC filter of Example 3 is calculated as about 6.8 log. For the coconut filter of the Example 4 the collection of the effluent water is stopped at about 40 L (which is equivalent to about 1,570 filter material pore volumes) as the filter shows almost complete breakthrough at that volume of water. The F-BLR is calculated as about 1.9 log at about 1,570 filter material pore volumes.

F-VLR Test Procedure

The housings for the axial flow filters with mesoporous carbon are the same as those described in the F-BLR procedure above. Water contaminated with about 1×10⁷ PFU/L MS-2 flows through a housing/filter system at a flowrate of about 200 mL/min. The total amount of water flowing in can be about 2,000 filter material pore volumes or more. The MS-2 bacteriophages used are the ATCC # 15597B (American Type Culture Collection, Rockville, Md.). The MS-2 assay can be conducted according to the procedure by C. J. Hurst, Appl. Environ. Microbiol., 60(9), 3462 (1994), the substance of which is herein incorporated by reference. Other assays known in the art can be substituted. The limit of detection (LOD) is 1×10³ PFU/L. Effluent water is collected after the flow of about the first 2,000 filter material pore volumes, assayed to count the MS-2 bacteriophages present, and the F-VLR is calculated using the definition.

Figure 7B:
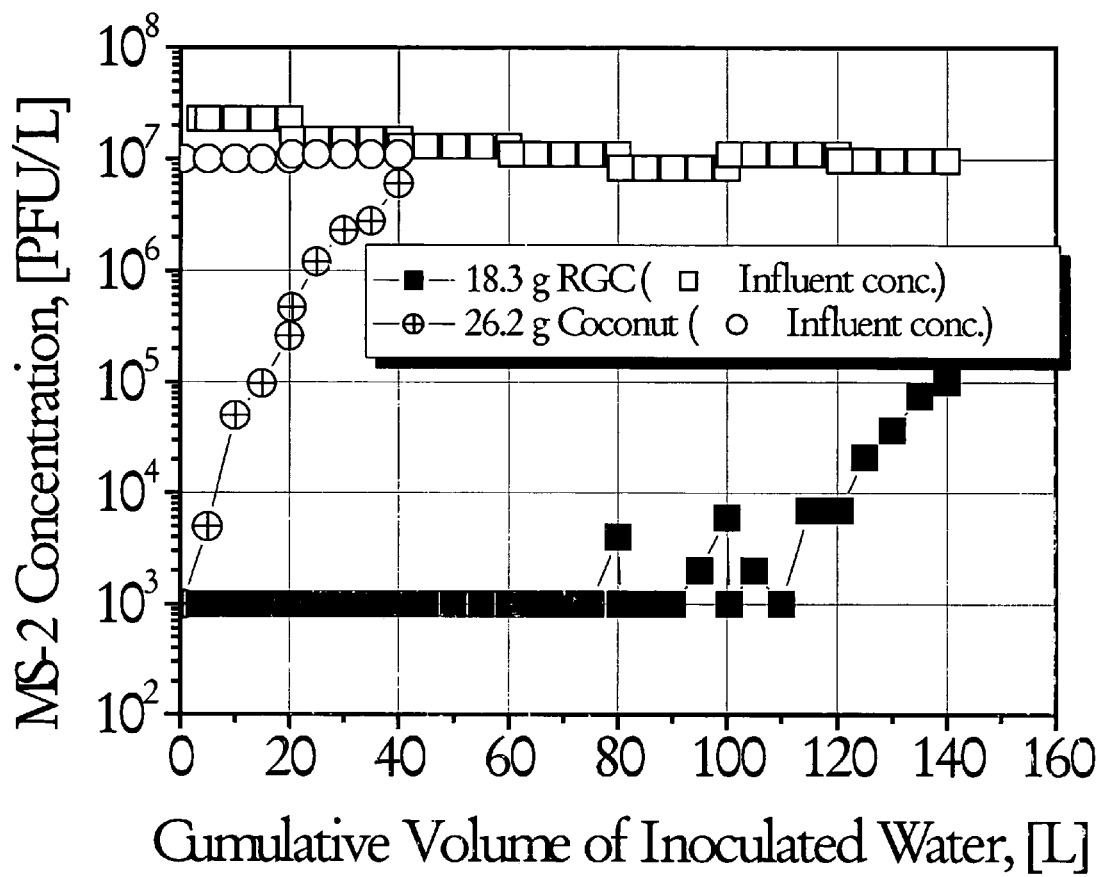
FIG. 7b illustrates the MS-2 flow concentration as a function of the cumulative volume of water through of 2 filters; one containing RGC mesoporous and basic activated carbon, and the other containing coconut microporous activated carbon particles.

Exemplary results used to calculate F-VLR are shown in FIG. 7b for the axial flow filters of Example 3 and Example 4. The flowrate used in FIG. 7b is about 200 mL/min and the influent concentration of MS-2 varied around about 1×10⁷ PFU/L. The filters are challenged with about 20 L once a week (every Tuesday) and the effluent water is assayed as described above. The F-VLR of the RGC filter of Example 3 is calculated as >about 4.2 log. For the coconut filter of the Example 4 the collection of the effluent water is stopped at about 40 L (which is equivalent to about 1,570 filter material pore volumes) as the filter shows almost complete breakthrough at that volume of water. The F-BLR is calculated as about 0.3 log at about 1,570 filter material pore volumes.

Calculation Procedures for Single-collector Efficiency, Filter Coefficient, Average Fluid Residence Time, and F-BLR The single-collector efficiency calculation for the filters uses Equation 4 and the dimensionless numbers described after that equation. Exemplary calculations for the axial flow RGC filter of Example 3 using the following parameters: $\epsilon=0.43$, $d_m=1$ μm, $d_c=45$ μm, $H=10^{-20}$ J, $\rho_m=1.058$ g/mL, $\rho_f=1.0$ g/mL, $\mu=1$ mPa·s, $T=298$ K, water flowrate $Q=200$ mL/min, filter diameter $D=7.623$ cm, and $U=0.0007$ m/s, give $\eta=0.01864$. For the same parameters and for $\alpha=1$, the filter coefficient is calculated according to Equation 2 as: $\lambda=354.2$ $m^{-1}$. Furthermore, the F-BLR of the same filter is calculated according to Equation 3 as about 1.95 log. Similar exemplary calculations for the coconut filter of Example 4, using the same parameters as above, give $\eta=0.00717$ and $\lambda=65.5\ m^{-1}$. Finally, the F-BLR of the same filter is calculated according to Equation 3 as about 0.36 log.

The present invention may additionally include information that will communicate to the consumer, by words and/or by pictures, that use of carbon filter particles and/or filter material of the present invention will provide benefits which include removal of microorganisms, and this information may include the claim of superiority over other filter products. In a highly desirable variation, the information may include that use of the invention provides for reduced levels of nano-sized microorganisms. Accordingly, the use of packages in association with information that will communicate to the consumer, by words and or by pictures, that use of the invention will provide benefits such as potable, or more potable water as discussed herein, is important. The information can include, e.g., advertising in all of the usual media, as well as statements and icons on the package, or the filter itself, to inform the consumer.

All documents cited in the Detailed Description of the Invention are, in relevant part, incorporated herein by reference, the citation of any document is not to be construed as an admission that it is prior art with respect to the present invention.

The embodiments described herein were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A filter for providing potable water, comprising:
   (a) a housing having an inlet and an outlet; and
   (b) a filter material disposed within said housing formed at least in part from a plurality of filter particles consisting of mesoporous activated carbon, wherein at least a portion of said plurality of filter particles is at least partially coated with silver or a silver-containing material, and wherein:
      (i) the sum of the mesopore and macropore volumes of said filter particles is between about 0.2 mL/g and about 2 mL/g; wherein mesopore means an intra-particle pore having a diameter between 2 nm and 50 nm and macropore means an intra-particle pore having a diameter greater than 50 nm;
      (ii) the total pore volume of said filter particles is greater than about 0.4 mL/g and less than about 3 mL/g; and
      (iii) the ratio of the sum of the mesopore and macropore volumes to the total pore volume of said filter particles is greater than about 0.3;
   wherein said filter is operable to remove microorganisms from water flowing into said inlet and out of said outlet; and
   wherein said filter has a Filter Bacteria Log Removal of greater than about 2 logs and a Filter Viruses Log Removal of greater than about 1 log.

2. The filter of claim 1, wherein the sum of the mesopore and the macropore volumes of said plurality of filter particles is from greater than 0.4 mL/g to about 2 mL/g.

3. The filter of claim 1, wherein said plurality of filter particles has a Bacteria Removal Index of greater than about 99% and a Viruses Removal Index of greater than about 90%.

4. The filter of claim 1, wherein said filter material has a single-collector efficiency, $\eta$, of between about 0.005 and 0.25, and a filter coefficient, $\lambda$, between about 4.0 $m^{-1}$ and about 14,000 $m^{-1}$.

5. The filter of claim 1, wherein said plurality of filter particles are basic and have a point of zero charge between about 9 and about 12, an Oxidation Reduction Potential between about 290 mV and about 175 mV.

6. A filter for providing potable water, comprising:
   (a) a housing having an inlet and an outlet; and
   (b) a filter material disposed within said housing formed at least in part from a plurality of filter particles consisting of mesoporous activated carbon and other materials selected from the group consisting of activated carbon powders, activated carbon granules, activated carbon fibers, zeolites, activated alumina, activated magnesia, diaromaceous earth, activated Silica, hydrotalcites, glass, polyethylene fibers, polypropylene fibers, ethylene maleic anhydride copolymers fibers, sand, clay and mixtures thereof, wherein at least a portion of the other materials are coated with silver or a silver-containing material, wherein:
      (i) the sum of the mesopore and macropore volumes of said filter particles is between about 0.2 mL/g and about 2 mL/g; wherein mesopore means an intra-particle pore having a diameter between 2 nm and 50 nm, and macropore means an intra-particle pore having a diameter greater than 50 nm;
      (ii) the total pore volume of said filter particles is greater than about 0.4 mL/g and less than about 3 mL/g; and
      (iii) the ratio of the sum of the mesopore and muacropore volumes to the total pore volume of said filter particles is greater than about 0.3;
   wherein said filter is operable to remove microorganisms from water flowing into said inlet and out of said outlet; and
   wherein said filter has a Filter Bacteria Log Removal of greater than about 2 logs and a-Filter Viruses Log Removal of greater than about 1 log.

7. A kit comprising:
   i) a filter according to claim 1; and
   ii) a package for containing the filter;
   wherein either the package or the filter housing comprises information that the filter or filter material provides: bacterial removal; virus removal; microbial removal; killing of bacteria, killing of viruses, killing of microbials, or any combination of these.

8. A kit comprising:
   i) a filter according to claim 6; and
   ii) a package for containing the filter;
   wherein either the package or the filter housing comprises information that the filter or filter material provides: bacterial removal; virus removal; microbial removal; killing of bacteria, killing of viruses, killing of microbials, or any combination of these.

9. A process for providing potable water, comprising passing contaminated water through the filter of claim 1 to provide potable water.

10. A process for providing potable water, comprising passing contaminated water through the filter of claim 6 to provide potable water.

11. The filter of claim 2, wherein the sum of the mesopore and macropore volume of said filter particles is greater than about 0.4 mL/g and less than about 1 mL/g.

12. The filter of claim 1, wherein the total pore volume of said filter particles is greater than about 0.4 mL/g and less than about 2 mL/g.

13. The filter of claim 1, wherein the pore volume is at least 0.03 mL/g for pore diameters between about 4 nm and about 6 nm.

14. The filter of claim 1, wherein said filter has a Filter Bacteria Log Removal of greater than about 4 logs, and a Filter Viruses Log Removal of greater than about 2 logs.

15. The filter of claim 14, wherein said filter has a Filter Bacteria Log Removal of greater than about 6 logs, and a Filter Viruses Log Removal of greater than about 4 logs.

16. The filter of claim 1, wherein said filter has a single-collector efficiency, $\eta$, of greater than about 0.002.

17. The filter of claim 1, wherein said filter particles are wood-based activated carbon particles having a Brunauer, Emmet, and Teller (BET) specific surface area between about 1,000 $m^2/g$ and about 2,000 $m^2/g$, a total pore volume between about 0.8 mL/g and about 2 mL/g, and the sum of the mesopore and macropore volumes is between about 0.4 mL/g and about 1.5 mL/g.

* * * * *

UNITED STATES PATENT AND TRADEMARK OFFICE
CERTIFICATE OF CORRECTION

PATENT NO.        : 7,614,508 B2                                          Page 1 of 1
APPLICATION NO.   : 10/705572
DATED             : November 10, 2009
INVENTOR(S)       : Michael Donovan Mitchell et al.

It is certified that error appears in the above-identified patent and that said Letters Patent is hereby corrected as shown below:

Column 7
    Line 29, please delete "inicroporous" and insert -- microporous --.

Column 12
    Line 58, please delete "$\frac{1}{3}$" and insert -- $1/3$ --.

Signed and Sealed this

Sixteenth Day of February, 2010

David J. Kappos
*Director of the United States Patent and Trademark Office*